(12) United States Patent
Madan et al.

(10) Patent No.: US 6,748,374 B1
(45) Date of Patent: *Jun. 8, 2004

(54) METHOD FOR GENERATING A RELATIONAL DATABASE QUERY STATEMENT USING ONE OR MORE TEMPLATES CORRESPONDING TO SEARCH CONDITIONS IN AN EXPRESSION TREE

(75) Inventors: Harpinder S. Madan, Stanford, CA (US); Brian Gustafson, Montara, CA (US); Uppili Srinivasan, Fremont, CA (US)

(73) Assignee: Oracle International Corporation, Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,160

(22) Filed: Dec. 7, 1998

(51) Int. Cl.[7] .............................................. G06F 17/30
(52) U.S. Cl. ...................... 707/3; 707/2; 707/4; 707/5; 707/100; 707/102; 707/104.1
(58) Field of Search .................... 707/1–10, 100–104.1, 707/200–206, 514, 532, 907; 709/200, 203, 223, 230, 245, 315

(56) References Cited

U.S. PATENT DOCUMENTS

| 4,714,995 | A |   | 12/1987 | Materna et al. |         |
|-----------|---|---|---------|----------------|---------|
| 5,295,256 | A |   | 3/1994  | Bapat          | 717/5   |
| 5,442,780 | A | * | 8/1995  | Takanashi et al.| 707/1  |
| 5,454,106 | A | * | 9/1995  | Burns et al.   | 707/4   |
| 5,471,613 | A | * | 11/1995 | Banning et al. | 707/4   |
| 5,499,371 | A |   | 3/1996  | Henninger et al.| 717/2  |
| 5,615,362 | A |   | 3/1997  | Jensen et al.  | 707/103 |
| 5,664,173 | A | * | 9/1997  | Fast           | 707/4   |
| 5,706,506 | A |   | 1/1998  | Jensen et al.  | 707/103 |
| 5,799,306 | A |   | 8/1998  | Sun et al.     |         |
| 5,806,074 | A |   | 9/1998  | Souder et al.  |         |
| 5,809,502 | A | * | 9/1998  | Burrows        | 707/7   |
| 5,884,324 | A |   | 3/1999  | Cheng et al.   |         |
| 5,937,409 | A |   | 8/1999  | Wetherbee      | 707/103 |
| 5,937,414 | A |   | 8/1999  | Souder et al.  |         |
| 5,963,932 | A | * | 10/1999 | Jakobsson et al.| 707/2  |
| 5,995,999 | A | * | 11/1999 | Bhardhwaj      | 709/200 |
| 6,009,422 | A | * | 12/1999 | Ciccarelli     | 707/4   |
| 6,012,067 | A |   | 1/2000  | Sarkar         | 707/103 |
| 6,016,499 | A |   | 1/2000  | Ferguson       | 707/104 |
| 6,029,178 | A |   | 2/2000  | Martin et al.  |         |
| 6,047,284 | A | * | 4/2000  | Owens et al.   | 707/4   |
| 6,052,681 | A |   | 4/2000  | Harvey         | 707/3   |
| 6,058,401 | A |   | 5/2000  | Stamos et al.  |         |
| 6,078,925 | A |   | 6/2000  | Anderson et al.|         |
| 6,085,188 | A | * | 7/2000  | Bachmann et al.| 707/3   |
| 6,122,258 | A | * | 9/2000  | Brown          | 370/256 |

(List continued on next page.)

OTHER PUBLICATIONS

Ein–Dor, Phillip; Spiegler, Israel, Journal of Management Information Systems, Summer 95, vol. 12 Issue 1, p. 171, 27 pages, 1995.*

(List continued on next page.)

*Primary Examiner*—Srirama Channavajjala
(74) *Attorney, Agent, or Firm*—Bingham McCutchen LLP

(57) ABSTRACT

A method and system for representing objects in a relational database is provided. In one aspect, the invention provides a method and system for storing directory information objects in a relational database management system. In addition, a method and system for generating a statement in a database query language to search or manipulate objects or entries that are stored in a relational database is disclosed. An aspect of the invention is directed to a method and system that can automatically generate a SQL statement for an LDAP search filter.

38 Claims, 22 Drawing Sheets

U.S. PATENT DOCUMENTS

| | | | |
|---|---|---|---|
| 6,122,630 | A | 9/2000 | Strickler et al. |
| 6,131,098 | A | 10/2000 | Zellweger |
| 6,134,559 | A | 10/2000 | Brumme et al. |
| 6,154,743 | A * | 11/2000 | Leung et al. ............... 707/10 |
| 6,163,776 | A | 12/2000 | Periwal |
| 6,178,416 | B1 * | 1/2001 | Thompson et al. ............ 707/3 |
| 6,189,000 | B1 * | 2/2001 | Gwertznan et al. ............ 707/1 |
| 6,199,062 | B1 * | 3/2001 | Byrne et al. .................... 707/3 |
| 6,301,589 | B1 | 10/2001 | Hirashima et al. |
| 6,338,092 | B1 | 1/2002 | Chao et al. |
| 6,356,913 | B1 | 3/2002 | Chu et al. |
| 6,412,017 | B1 | 6/2002 | Straube et al. |
| 6,453,310 | B1 | 9/2002 | Zander |

OTHER PUBLICATIONS

Ozsoyoglu, Gultekin; Matos, Victor; Ozsoyoglu, Z. Meral, ACM Trans. Database System 14, 4, Dec. 1989, pp. 526–573.*

Innosoft Int., Inc., LDAP FAQ, Jun., 1997, pp. 1–7.

W.Yeong, et al. Lightweight Directory Access Protocol, Mar., 1995, pp. 1–20.

T. Howes, A String Representation of LDAP Search Filters, Dec. 1993, pp. 1–3.

T. Howes, et al., The String Representation of Standard Attribute Syntaxes, Mar., 1995, pp. 1–11.

S. Kille, A String Representation of Distinguished Names, Mar., 1995, pp. 1–8.

A. Young, Connection–less Lightweight Directory Access Protocol, Jun. 1995, pp. 1–8.

T. Howes, et al., The LDAP Application Program Interface, Aug. 1995, pp. 1–20.

T. Howes, et al., An LDAP URL Format, Jun. 1996, pp. 1–4.

Idap–support@umich.edu, Referrals Within the LDAPv2 Protocol, Aug., 1996, pp. 1–4.

Innosoft Int., Inc. Lightweight Directory Access Protocol (Version 3) Specifications, 1996–1998, pp. 1–3.

Howes, et al., A Scalable, Deployable, Directory Service Framework for the Internet, Aug., 1995, pp. 1–2.

Microsoft Computer Dictionary, Microsoft Press, Third Edition, p. 392.

* cited by examiner

FIG. 2A

Organization Class Table

| Entry No. | Org. Name |
|---|---|
| 96 | Oracle |

Department Class Table

| Entry No. | Org. Name | State |
|---|---|---|
| 97 | Administrative | CA |
| 98 | Sales | NY |
| 99 | R & D | CA |

Person Class Table

| Entry No. | Last Name | First Name | Tel. No. | State | Manager |
|---|---|---|---|---|---|
| 100 | Doe | John | 555-1111 | CA | Larry Founder |
| 101 | Smith | Jim | 555-2222 | NY | John Doe |
| 102 | Jones | Joe | 555-3333 | CA | Jim Smith |
| 103 | Founder | Larry | 555-4444 | CA | |

↗ 208

↙ 206

Revised Person Class Table

| Entry No. | Last Name | First Name | Tel. No. | Manager | State | Email Address |
|---|---|---|---|---|---|---|
| 100 | Doe | John | 555-1111 | Larry Founder | CA | Joe |
| 101 | Smith | Jim | 555-2222 | John Doe | NY | |
| 102 | Jones | Joe | 555-3333 | Jim Smith | CA | |
| 103 | Founder | Larry | 555-4444 | | CA | |

Attribute Store Table

| EID | AttrName | AttrVal | AttrKind |
|---|---|---|---|
| 96 | Org. Name | Oracle | User |
| 97 | Dept. Name | Administration | User |
| 97 | State | CA | User |
| 98 | Dept. Name | Sales | User |
| 98 | State | NY | User |
| 99 | Dept. Name | R & D | User |
| 99 | State | CA | User |
| 100 | First name | John | User |
| 100 | Last name | Doe | User |
| 100 | Tel. No. | 555-1111 | User |
| 100 | Manager | Larry Founder | User |
| 100 | State | CA | User |
| 101 | First name | Jim | User |
| 101 | Last name | Smith | User |
| 101 | Tel. No. | 555-2222 | User |
| 101 | Manager | John Doe | User |
| 101 | State | NY | User |
| 102 | First name | Joe | User |
| 102 | Last name | Jones | User |
| 102 | Tel. No. | 555-3333 | User |
| 102 | Manager | Jim Smith | User |
| 102 | State | CA | User |
| 103 | First name | Larry | User |
| 103 | Last name | Founder | User |
| 103 | Tel. No. | 555-4444 | User |
| 103 | State | CA | User |
| 100 | Modifiation Timestamp | 01/01/97 | Operational |
| 101 | Modification Timestamp | 07/01/97 | Operational |
| 102 | Modification Timestamp | 07/30/98 | Operational |
| 103 | Modification Timestamp | 01/01/98 | Operational |

FIG. 4

| | EID | AttrName | AttrVal | AttrKind |
|---|---|---|---|---|
| | ⋮ | ⋮ | ⋮ | ⋮ |
| 416 | 100 | First name | John | User |
| 418 | 100 | Last name | Doe | User |
| 420 | 100 | Tel. No. | 555-1111 | User |
| 422 | 100 | Manager | Larry Founder | User |
| 423 | 100 | State | CA | User |
| 446 | 100 | Modification Timestamp | 01/01/97 | Operational |
| 502 | 2 | Attribute_Type | Name="First Name" Parameter=name syntax; only one first name; | User |
| 504 | 2 | Attribute_Type | Name="Last Name" Parameter=name syntax; only one first name; | User |
| 506 | 2 | Attribute_Type | Name="Tel. No." Parameter=telephone number syntax; can have up to two. | User |
| 508 | 2 | Attribute_Type | Name="Manager" Parameter=name syntax with first and last name; can have multiple managers. | User |
| 509 | 2 | Attribute_Type | Name="State" Parameter=State syntax; only one state | User |
| 510 | 2 | Attribute_Type | Name="Modification Timestamp" Parameter=date syntax; only one modification timestamp. | User |
| 512 | 2 | Object classes | Name="Person"; Mandatory Attr= "First Name", "Last Name", "Modification Timestamp"; Optional Attr= "Tel.No.", "Manager", "State" | User |
| 514 | 100 | Object class | Person | User |
| | ⋮ | ⋮ | ⋮ | ⋮ |

FIG. 5

Last Name Catalog Table

| EID | AttrValue |
|-----|-----------|
| 100 | Doe |
| 103 | Founder |
| 102 | Jones |
| 101 | Smith |

FIG. 6A

First Name Catalog Table

| EID | AttrValue |
|-----|-----------|
| 101 | Jim |
| 100 | Joe |
| 102 | John |
| 103 | Larry |

FIG. 6B

Telephone Number Catalog Table

| EID | AttrValue |
|-----|-----------|
| 100 | 5551111 |
| 101 | 5552222 |
| 102 | 5553333 |
| 103 | 5554444 |

FIG. 6C

Manager Catalog Table

| EID | AttrValue |
|-----|-----------|
| 102 | joe jones |
| 101 | john doe |
| 100 | larry founder |

FIG. 6D

State Catalog Table

| EID | AttrValue |
|-----|-----------|
| 97  | CA        |
| 98  | NY        |
| 99  | CA        |
| 100 | CA        |
| 101 | NY        |
| 102 | CA        |
| 103 | CA        |

FIG. 6E

Distinguished Name Table

| EID | RDN | ParentDN |
|---|---|---|
| 96 | Oracle | |
| 97 | Administration | Oracle |
| 98 | Sales | Oracle |
| 99 | R&D | Oracle |
| 100 | John Doe | Oracle.R&D |
| 101 | Jim Smith | Oracle.R&D |
| 102 | John Jones | Oracle.Sales |
| 103 | Larry Founder | Oracle.Administrative |

700

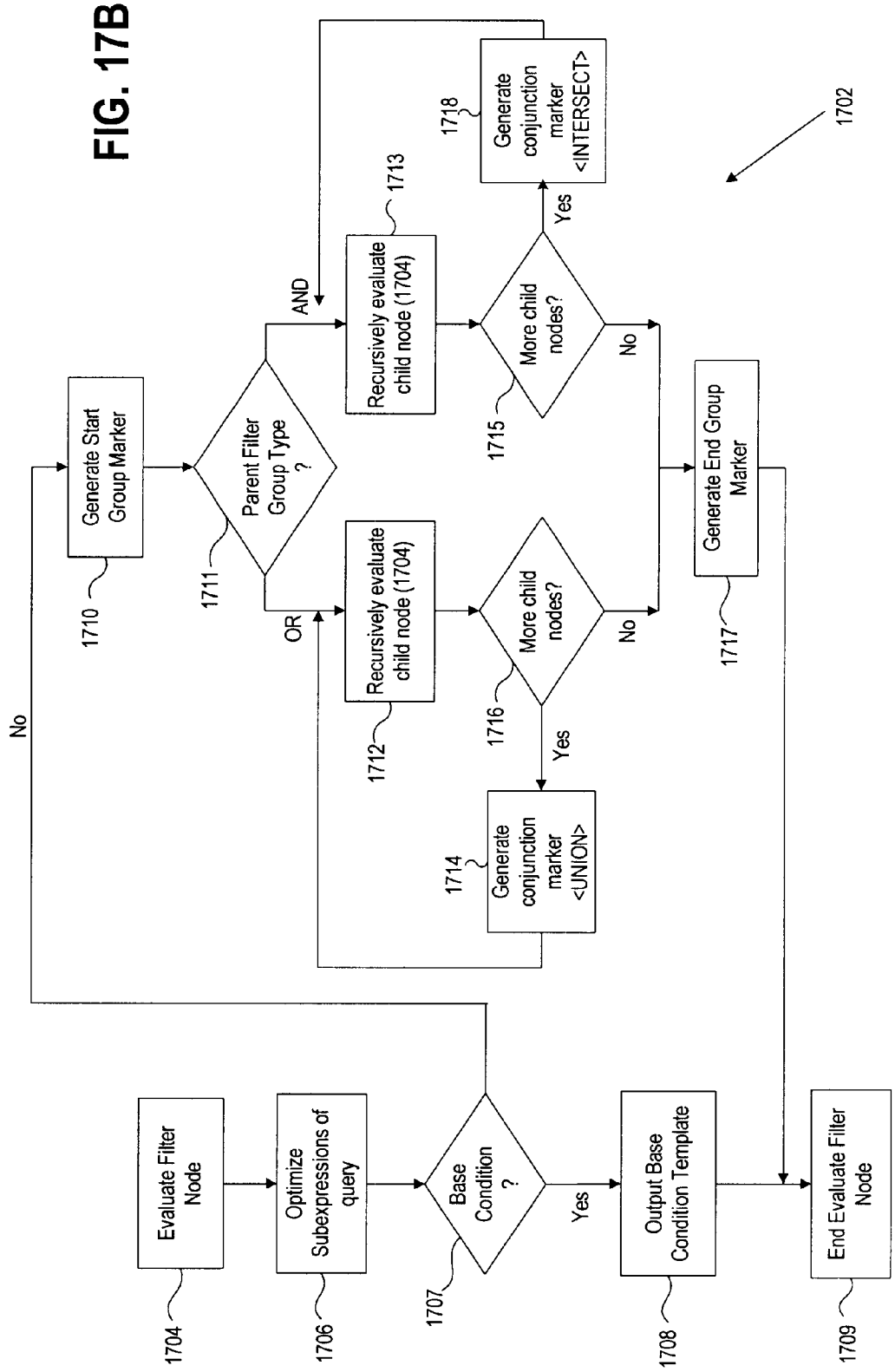

METHOD FOR GENERATING A RELATIONAL DATABASE QUERY STATEMENT USING ONE OR MORE TEMPLATES CORRESPONDING TO SEARCH CONDITIONS IN AN EXPRESSION TREE

BACKGROUND OF THE INVENTION

1. Field of the Invention

The present invention is related to the storage of data within database systems. More particularly, the present invention is directed to the storage and access of object-oriented entities within a relational database management system.

2. Background

Many computer programming languages and applications utilize object-oriented structures to model real world information. Object-oriented languages and applications access and store data in the form of entities such as objects and attributes. For example, many conventional applications used for querying and maintaining directory information systems are modeled using aspects of object-oriented techniques and entities. Directory information systems provide a framework for the storage and retrieval of information that are used to identify and locate the details of individuals and organizations, such as telephone numbers, postal addresses, and email addresses.

One common type of object-oriented based directory systems is a directory based on the Lightweight Directory Access Protocol ("LDAP"). LDAP is a directory protocol that was developed at the University of Michigan, originally as a front end to access directory systems organized under the X.500 standard for open electronic directories (which was originally promulgated by the Comite Consultatif International de telephone et Telegraphe "CCITT" in 1988). Standalone LDAP server implementations are now commonly available to store and maintain directory information. Further details of the LDAP directory protocol can be located at the LDAP-devoted website maintained by the University of Michigan at http://www.umich.edu/~dirsvcs/ldap/, including the following documents (which are hereby incorporated by reference): RFC-1777 Lightweight Directory Access Protocol; RFC-1558 A String Representation of LDAP Search Filters; RFC-1778 The String Representation of Standard Attribute Syntaxes; RFC-1779 A String Representation of Distinguished Names; RFC-1798 Connection-less LDAP; RFC-1823 The LDAP Application Program Interface; and, RFC-1959 An LDAP URL Format.

LDAP directory systems are normally organized in a hierarchical structure having entries (i.e., objects) organized in the form of a tree, which is referred to as a directory information tree ("DIT"). The DIT is often organized to reflect political, geographic, or organizational boundaries. A unique name or ID (which is commonly called a "distinguished name") identifies each LDAP entry in the DIT. An LDAP entry is a collection of one or more entry attributes. Each entry attribute has a "type" and one or more "values." Each entry belongs to one or more object classes. Entries that are members of the same object class share a common composition of possible entry attribute types.

Referring to FIG. 1, shown is an example of a hierarchical tree of directory entities. Entry 96 is the top most level of DIT 20 and is of object class "organization" having an attribute type "Org. Name" with an attribute value of "Oracle". Entry 96 is the "parent" entry for three "child" entries (97, 98, and 99) directly beneath it in DIT 20. Entries 97, 98, and 99 are objects of object class "Department" each having attributes "Dept. Name" and "State." Entry 97 has an attribute type "Dept. Name" having a value of "Administration" and an attribute type "State" with the value "CA". Entry 98 has an attribute "Dept. Name" with the value "Sales" and an attribute type "State" with an attribute value "NY". Entry 99 has an attribute type "Dept. Name" with an attribute value "R&D" and an attribute type "State" with a value of "CA".

Entry 103 is a child entry of entry 97. Entry 103 represents an object of class "Person" having the following attribute type-value pairs: (1) attribute type "Last Name" with a value of "Founder"; (2) attribute type "First Name" with a value of "Larry"; (3) attribute type "Tel. No." with a value of "555-4444"; and (4) attribute type "State" with a value of "CA".

Entry 102 is a child entry of entry 98. Entry 102 represents an object of class "Person" having the following attribute type-value pairs: (1) attribute type "Last Name" with a value of "Jones"; (2) attribute type "First Name" with a value of "Joe"; (3) attribute type "Tel. No." with a value of "555-3333"; (4) attribute type "Manager" having the value of "Jim Smith"; and (5) attribute type "State" having the value "CA". Note that entries 102 and 103 are both members of object class Person, but entry 102 has more listed object attributes than entry 103. In many object-oriented systems, objects that are members of the same object class may share a common set of possible object attributes, but some members of the class may not necessarily have values for some of the possible attributes. In this example, entry 103 does not have a value for attribute type "Manager" while entry 102 does have a value for this attribute.

Entries 100 and 101 are child entries of entry 99. Entries 100 and 101 are both members of object class "Person." Entry 100 is defined by the following attribute type-value pairs: (1) attribute type "Last Name" with a value of "Doe"; (2) attribute type "First Name" with a value of "John"; (3) attribute type "Tel. No." with a value of "555-1111"; (4) attribute type "Manager" having the value of "Larry Founder"; and (5) attribute type "State" having the value "CA". Entry 101 is defined by the following attribute type-value pairs: (1) attribute type "Last Name" with a value of "Smith"; (2) attribute type "First Name" with a value of "Jim"; (3) attribute type "Tel. No." with a value of "555-2222"; and (4) attribute type "Manager" having the value of "John Doe"; and (5) attribute type "State" having the value "NY".

One significant issue that has been faced by organizations seeking to develop an LDAP system is the selection of the type and configuration of a database system used to store the object-oriented LDAP data. A particularly desirable choice for many database configurations is to utilize a relational database management system ("RDBMS"). The relational database model provides many benefits when implementing a database application. For example, the relational database model has well-defined structures and entities (e.g., tables, views, indexes, etc.) to store or access the data of a database. RDBMS systems provide advanced database transaction, data consistency, recovery, and backup support. RDBMS systems also provide for clearly defined actions and operations to manipulate the data and structures of the database. Moreover, many RDBMS applications are designed to interoperate with standard database query languages (e.g., SQL) to access and modify data on the system.

The difficulty with implementing object-oriented applications, such as LDAP directory systems, in an RDBMS is that object-oriented data are based upon a fundamentally different data model than relational data. Object-oriented data are formed as entities which have specific object-oriented characteristics (e.g., objects and attributes). In contrast, the data in a relational database model are normally stored in database tables that are organized as an array of rows and columns. The values in the columns of a given row are typically associated with each other in some way. For example, a row may store a complete data record relating to a sales transaction, a person, or a project. Columns of the table define discrete portions of the rows that have the same general data format or data type. Thus, there are significant differences in structure between object-oriented data and relational data.

FIGS. 2A, 2B, and 2C depict one approach to storing object-oriented data, such as the entries from DIT 20 of FIG. 1, into an RDBMS. In this approach, a separate table is provided for each object class in the system. FIG. 2A shows an object class table 202 for the Organization class, which includes entry 96 from DIT 20 as a member of that class. FIG. 2B is an example of an object class table 204 for the object class Department, which includes entries 97, 98, and 99. FIG. 2C is an example of an object class table 206 for the object class Person, which includes entries 100, 101, 102, and 103 from DIT 20.

Each row of the object class table represents a single object of that corresponding object class. Thus, the Person class table 206 of FIG. 2C includes four rows, one row for each of the person class entries of DIT 20 (i.e., entries 100, 101, 102, and 103). Discrete columns within the object class table represent attributes of an object within the object class. A separate column must be provided for each possible attribute of an object class. The Person class table 206 of FIG. 2C includes five columns for object attributes "Last Name," "First Name," "Tel. No.," "Manager," and "State." Similar rows and columns in FIGS. 2A and 2B describe the objects and attributes for the Department and Organization objects of DIT 20. Thus, the approach illustrated in FIGS. 2A, 2B, and 2C can be employed to represent object-oriented data in relational tables.

Referring to FIG. 2C, note that row 208 contains an empty space in the "Manager" column. This highlights one of the drawbacks of this approach. It is possible that some members of an object class may not have values for all possible attributes for that class. Entry 103 does not have a value for the "Manager" attribute, even though other members of the Person class 20 possess a value for that attribute type. The problem is that in the approach illustrated by FIGS. 2A–C, a column must be defined for each of the possible attributes of an object class. For each row in the table, resources may be set aside to allow values for all of the defined columns, even if some rows do not actually have values for one or more of the columns. Under this approach, system resources are wasted if any members of the class do not have a value for all defined attributes for the object class. This problem is further exasperated by very large object class tables having a large number of members that do not have values for particular columns.

Another drawback to this approach is that object class tables are not readily extensible, since the database schema itself has to be modified to allow changes to the definition of an object class. Such a change in definition occurs, for example, if an object attribute is being added or deleted from an object class. For example, consider when object class Person (represented by object class table 206 in FIG. 2C) is to be modified to include a new object attribute type called "Email Address." To implement this modification to the Person object class, the defining schema structure of the corresponding object class table must be modified to include a new column for the new attribute type. FIG. 3 depicts a revised Person class table 302 that includes a column for the new attribute type "Email Address." In operation, this modification typically involves the issuance of numerous data definition language ("DDL") statements to modify the base schema of the database.

Generally, modifying the database schema is not a trivial task, and is performed only by administrators having specialized privileges to access and modify the metadata and structural definitions of the system. Moreover, adding columns to an existing relational database table could result in database fragmentation. This occurs because the data for the new column may not be co-located with the existing table data on a disk drive. Thus, performance suffers because two disk locations are accessed to access a single row from the database table. In addition, the method described with reference to FIGS. 2A–C suffers drawbacks when storing objects types that have multiple attribute values for an attribute type, since a single column is provided for an attribute type in an object class table.

Therefore, there is a need for an improved method and system for storing and maintaining object-oriented data in an RDBMS. In addition, there is a particular need for an improved system and method of storing and maintaining directory information objects, such as LDAP data, in an RDBMS.

SUMMARY OF THE INVENTION

A method and system for representing object-oriented data in a relational database is disclosed. An aspect of the invention is directed to the representation and storage of directory information objects, such as LDAP directory data, in a relational database system.

An aspect of the invention is directed to the generation of a database query language statement to query or manipulate directory information objects in a relational database. A feature of this aspect of the invention is the generation of a SQL statement for an LDAP search filter. Another aspect of the invention is directed to the hybrid use of Join operations with other types of aggregation operations in the generated SQL.

Further details of aspects, objects, and advantages of the invention are described below in the detailed description, drawings, and claims. Both the foregoing general description and the following detailed description are exemplary and explanatory in nature, and serve to explain the principles of the invention.

BRIEF DESCRIPTION OF THE DRAWINGS

FIGS. 2A, 2B, and 2C depict object class tables for storing object-oriented data in relational tables.

FIG. 4 shows an attribute-store table according to an embodiment of the invention.

FIG. 5 depicts an attribute-store table having metadata entries.

FIGS. 6A, 6B, 6C, 6D and 6E depict examples of catalog tables according to an embodiment of the invention.

FIGS. 17A and 17B are flow diagrams showing a process for generating the body section of a SQL statement for a search filter.

DETAILED DESCRIPTION

System Architecture

An embodiment of the present invention involves the implementation of a single table that comprises information describing objects and object attributes on the system. This table is hereby referred to as the "attribute_store" table. The attribute_store table comprises four columns having the following characteristics:

| Column Name | Datatype | Constraint | Description |
| --- | --- | --- | --- |
| EID | Number | Not null | ID for an entry |
| AttrName | Character-numeric | | Attribute ID for a particular attribute |
| AttrVal | Character-numeric | | Attribute values |
| AttrKind | Character string | Not null | Kind of Attribute (Operational, User etc.) |

Figure 1:
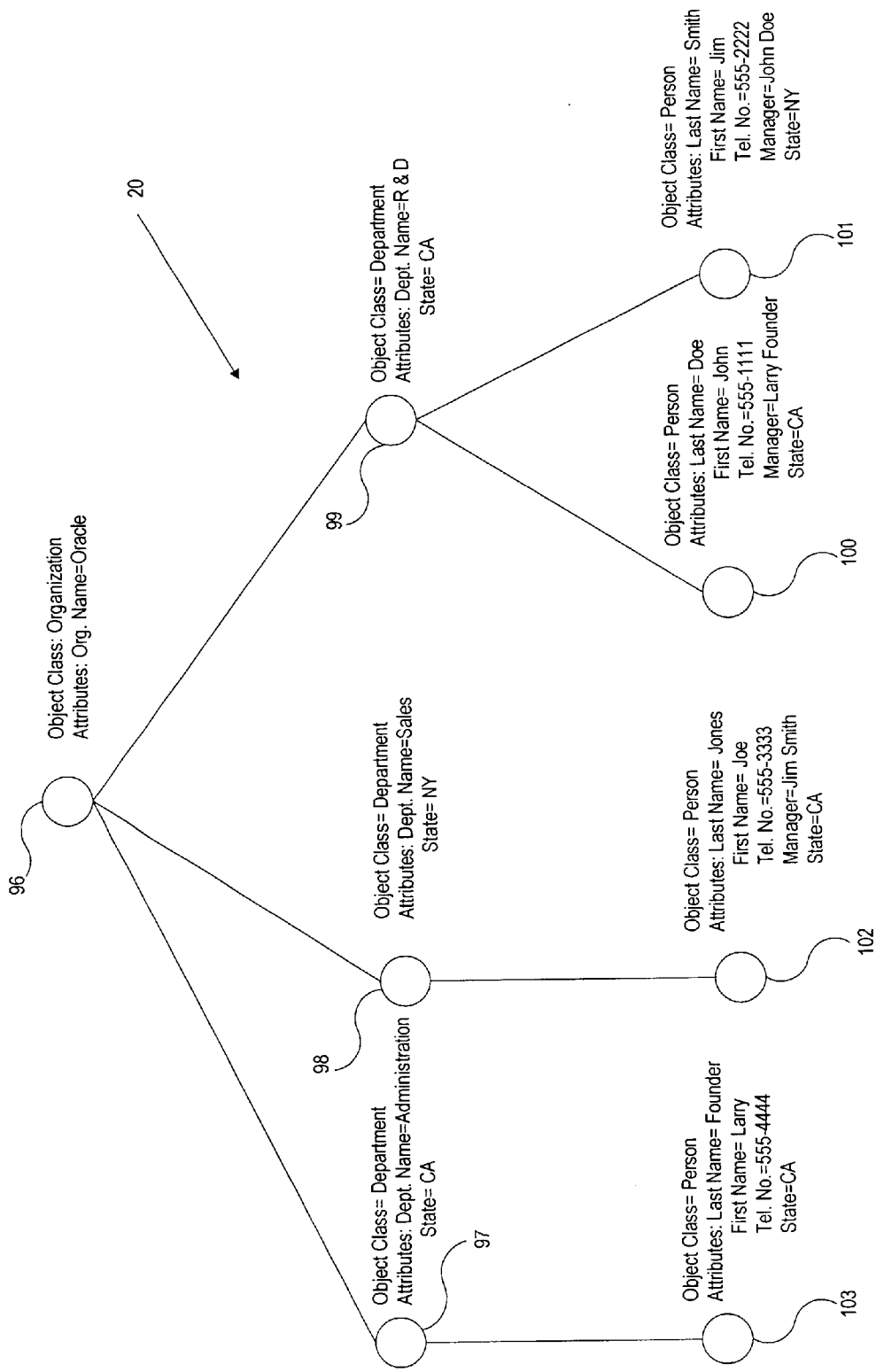
FIG. 1 illustrates an example of a directory information tree.
Figure 3:
FIG. 3 depicts a revised version of the object class table of FIG. 2C.

FIG. 4 depicts an example of an attribute_store table 400 for entries in the DIT 20 of FIG. 1. All entries in DIT 20 are represented in attribute_store table 400, regardless of the particular object class that an entry belongs to. An entry is represented by one or more rows in table 400. A set of rows having the same EID describes the attributes for the same entry in DIT 20. Each row shown in attribute_store table 400 corresponds to a separate attribute for an entry.

Consider entry 100 from DIT 20, which is represented in attribute_store table 400 by rows 416, 418, 420, 422, 423, and 446. The combination of the contents of these rows describes the attributes of entry 100. Each row in attribute_store table 400 comprises a column that identifies that row's corresponding EID. These particular rows (416, 418, 420, 422, 423, and 446) are identified as being associated with entry 100 since all of these rows comprise the same value of 100 in their EID column. Each of these rows describes a different attribute for entry 100. For each row, the "AttrName" column identifies which object attribute is being described, and the "AttrVal" column identifies the value(s) for that attribute. For entry 100, row 416 describes attribute "First Name" having a value of "John", row 418 identifies the value "Doe" for attribute "Last Name", row 420 identifies the value "555-1111"0 for attribute "Tel No.", row 422 identifies the value "Larry Founder" for attribute "Manager," and row 423 identifies the value "CA" for attribute "State." Each of the other entries from DIT 20 is similarly represented by sets of one or more rows in the attribute_store table 400.

In an embodiment, the rows in attribute_store table 400 contain an "AttrKind" column. This column identifies additional system categories for the object attributes. For example, one category of attribute kinds that can be identified according to the invention refers to access and modification privileges for particular object attribute. Two examples of attribute kinds relating to access and modification privileges are "User" and "Operational" attributes. User attributes are attributes that can be modified by the user, entity or organization associated with a particular entry. Operational attributes are attributes that are maintained by the system, and thus cannot be altered or modified except by the system. For example, row 420 identifies attribute type "Tel. No." for entry 100 as being of AttrKind user, and thus the user or entity associated with entry 100 is permitted to modify this attribute value. Row 446 provides an example of an attribute type that is of attribute kind "operational" (i.e., "Modification Timestamp"). Many directory systems maintain a timestamp of the last modification time/date for each directory entry. Row 446 describes attribute "modification timestamp" for entry 100 having a value of "Jan. 1, 1997." Since this attribute type is "operational," the entity or person corresponding to entry 100 is not normally permitted to modify this attribute value. In an alternate embodiment of the invention, the attribute_store table is configured without having a column for the AttrKind value.

Metadata

The present invention provides an improved method for adding, modifying, and maintaining metadata in the system. In a database system, metadata refers to information that describes the data in the system. Metadata information includes data that describes the structure and parameters of the tables and data maintained in the system. In a conventional RDBMS, metadata is usually maintained separately from its associated data and tables on the system.

One significant advantage of the present invention is that metadata, such as directory schema information, can be maintained within the same table as its associated data. To accomplish this, the present invention permits rows that define metadata, referred to as "subschema entries," to be inserted into the attribute_store table. Subschema entries allow management of the directory schema for the system without having to issue DDL commands to modify the database schema. In an embodiment, subschema entries comprise the following characteristics for columns in the attribute_store table:

| Column Name | Datatype | Constraint | Description |
| --- | --- | --- | --- |
| EID | Number | Not null | EID indicative of subschema entries |
| AttrName | Character string | Not null | Identifies the type of subschema entity being added (e.g., attribute, object class, etc.) |
| AttrVal | Encoded string | Not null | Subschema element name and parameters |

-continued

| Column Name | Datatype | Constraint | Description |
|---|---|---|---|
| AttrKind | Character string | Not null | Kind of subschema entry (e.g., user, Operational, etc.) |

FIG. 5 illustrates the use of subschema entries to define metadata in the system. Depicted in FIG. 5 is an attribute_store table showing selected rows that describe the attributes for entry 100 of DIT 20 (i.e., rows 416, 418, 420, 422, 423, and 446). The table of FIG. 5 also includes additional rows (rows 502, 504, 506, 508, 509, 510, 512, and 514) that describe some of the metadata associated with entry 100. In an embodiment, subschema entries that define new object classes or object attributes comprise a selected EID value that is indicative of that particular type of subschema entry. In the table of FIG. 5, rows having an EID of "2" are recognized by the system as subschema entries that define system metadata for attributes and object classes. Whenever a row is added to the attribute_store table with an EID value of 2, the system recognizes that a new metadata definition has been added. The AttrName column of a subschema entry identifies the type of subschema entity being added. In the example of FIG. 5, a subschema entry that adds a new attribute type would contain the value "Attribute Type" in the AttrName column (i.e., rows 504, 506, 508, 509, and 510). A subschema entry that adds a new object class contains the value "Object Classes" in the AttrName column (i.e., row 512). The AttrVal column for a subschema entry describes the name and parameters of the new metadata type that is being added. The AttrKind column of the subschema entry identifies additional system kinds or categories for the object class or attribute being added.

To illustrate this aspect of the invention, consider row 506, which is a subschema entry that defines the attribute type "Tel. No." The EID column of row 506 contains the value "2", to indicate that this row is a subschema entry that is modifying the directory system metadata. The AttrName column of row 506 contains the value "Attribute_Type" to indicate that row 506 is defining an attribute type. The AttrVal column of row 506 indicates that the name of the attribute type being defined is "Tel. No."

The AttrVal column also describes the defining parameters of the new object attribute. One such parameter is the attribute encoding syntax for the allowable values for this attribute. In this example, the particular attribute encoding syntax defined in row 506 describes the syntax for information permitted to be entered in the "AttrVal" column of row 420 (since row 420 describes an attribute of the attribute type defined in row 506). The attribute coding syntax for any particular attribute can be selected to achieve desired formatting and input requirements for that attribute. In an embodiment, a set of syntax definitions can be predefined in the system, and all new attribute types added to the system must correspond to these pre-defined syntax definitions. For example, a particular attribute coding syntax called "TelephoneNumberSyntax" can be defined for encoding values for attributes types related to telephone numbers in the directory system. In a present embodiment, the standard attribute coding syntax definitions utilized in the invention are based upon standard syntaxes published for the LDAP directory protocol.

The AttrVal column of a subschema entry can also identify the quantity of values to be provided for the defined attribute type. For example, if the attribute being added is a telephone number, it is possible for some entities to have more than one telephone number. A parameter can be defined in the subschema entry that specifies a minimum or maximum number of telephone number values allowed for that attribute. Alternatively, the subschema entry could identify whether an attribute type comprises either single value, or multiple values of that attribute. These examples of parameters used for subschema entries are only exemplary; other types of attribute parameters can be employed for subschema entries within the scope of the present invention.

Subschema entries can also be utilized to define an object class. Row 512 is a subschema entry that defines the object class "Person." The EID column of row 512 has a value of "2", which identifies this row as a subschema entry that defines directory schema metadata. The AttrName column of row 512 contains the character string "ObjectClasses" to indicate that metadata for an object class is being defined. The AttrVal column provides the name of the defined object class. In row 512, the name of the defined object class is identified as "Person." Additional information is also stated in the AttrVal column to define the parameters of the object class. For example, one such parameter is the mandatory attributes of the new object class. Each member of an object class must have stated values for the mandatory attributes. In the example of row 512, the mandatory attributes of object class "Person" are attribute types "First Name", "Last Name", and "Modification Timestamp". Other parameters that may be defined are the optional attributes of the object class. Members of an object class are permitted to have no stated values for optional attributes. In row 512, the optional attributes of object class "Person" are defined to be attribute types "Tel. No." and "Manager". Row 512 also identifies the attribute kind of the object class as type "User".

Row 514 provides an example of a metadata row to define a member of an object class. In row 514, entry 100 is defined as a member of object class "Person." The EID column of row 514 contains the EID of the new object. The AttrName column identifies that a new member of an object class is being created. The AttrVal column of row 514 identifies the particular object class that the new entry is a member of. The AttrKind column identifies the kind of the new object. In this row, the new object is of attribute kind "User."

To further illustrate the invention, consider the situation when object class Person of DIT 20 (FIG. 1) is to be modified to include a new attribute type "Email Address." To implement this modification, the following subschema entry is added to attribute_store table 400 to define the new attribute type:

| 2 | Attribute_Type | Name = "Email Address" Parameter = email syntax; more than one value allowed | User |
|---|---|---|---|

The subschema entry for each object class seeking to add the new attribute type to its definition is modified. Since object class Person is being modified in this example, Row 512 from attribute_store table 400 (which defines object class Person) is modified to include the new attribute type as part of the definition for this class (the modifications are italicized):

| 2 | Object classes | Name = "Person" Mandatory Attr = "First Name", "Last Name", "Modification Timestamp"; Optional Attr = "Tel No.", "Manager", "Email Address" | User |
|---|---|---|---|

Finally, each member of object class Person that seeks to define a value for this attribute type may add a new row to the attribute_store table with the appropriate attribute values. Thus, if entry 100 seeks to include the email address "jdoe" as an attribute, the following row is added to attribute_store table 400:

| 100 | Email Address | jdoe | User |
|---|---|---|---|

Catalog Tables

Specialized tables, referred to herein as "catalog tables", are maintained as indexes into the attribute_store table. Catalog tables provide efficient searches for objects having particular attribute values in the attribute-store table. A separate catalog table is maintained for each attribute type that is indexed. Each catalog table comprises two columns. The first column is the EID column, which identifies the EID of an entry or object having an attribute of the cataloged attribute type. The second column provides the attribute value for that corresponding EID and attribute type.

FIGS. 6A–E depict examples of catalog tables for some of the attribute types shown in attribute_store table 400. FIG. 6A depicts a catalog table that indexes the attribute type "Last Name." Each entry having an attribute of type "Last Name" is cataloged in the table of FIG. 6A. Similarly, FIG. 6B depicts a catalog table for the attribute type "First Name", FIG. 6C depicts a catalog table for the attribute type "Telephone Number", FIG. 6D depicts a catalog table for the attribute type "Manager", and FIG. 6E depicts a catalog table for the attribute type "State".

Each row of the catalog table is directed to a different entry that contains the cataloged attribute type. Each row identifies the EID of the entry of object comprising that attribute type, and the attribute value for that EID. If a new object is added to the system having an attribute of a cataloged type, then a new entry is added to the respective catalog table. If an existing object having a cataloged attribute type is deleted or the attribute for that object is deleted, then the corresponding entry in the respective catalog table is also deleted. In an embodiment, the catalog table is maintained in a sorted list of entries.

Catalog tables store the attribute value information in a normalized or canonical format, which is based upon matching rules established for each attribute type. Matching rules are descriptions of rules that are used to perform a query, search, sort, or comparison of attribute values. The definition of each attribute type specifies which matching rule should be used to compare its attribute values. One matching rule is specified for each type of matching (e.g., equality, substring, ordering, or approximate match) if that matching is allowed for the attribute type. The type of matching types allowed may depend on the syntax of the attribute type (e.g. ordering match may not be allowed on attribute types of syntax 'binary'). A matching rule may be used by multiple attribute types and multiple attribute syntaxes. The definition of a matching rule involves:

1. assigning an object identifier to the matching rule;
2. defining the syntax of an assertion of the matching rule;
3. specifying the different types of matches supported by the rule; and
4. defining the appropriate rules for evaluating a presented assertion with respect to target attribute values held in the directory information database;

A matching rule is used to evaluate attribute value assertions of attributes. The syntax used in the attribute value assertion (i.e. the assertion component of the attribute value assertion) is the matching rule's assertion syntax. A matching rule may apply to many different types of attributes with different attribute syntaxes. The definition of a matching rule includes a specification of the syntax of an assertion of the matching rule and the way in which values of this syntax are used to perform a match. A definition of a matching rule for use with attributes with different ASN.1 syntaxes specifies how matches are to be performed. In the preferred embodiment, the invention supports the standard LDAP protocol matching rules.

Based upon the matching rules, the normalized format for an attribute type may be significantly different from the raw value that is stored in the attribute_store table. For example, the attribute type "Tel. No." may have several permissible syntax variations for the attribute value information stored in the attribute_store table. These may include, for example, the following syntax variations being allowed for telephone numbers in the attribute_store table: (555) 555-1111; (555) 5551111; or 555-555-1111. However, the matching rules may indicate that only numbers are significant in a telephone number; all other characters and symbols in a telephone number are to be ignored. Thus, the canonical form of this telephone number may be stored in the catalog table in the following format: 5555551111. If a query is made against the telephone number catalog table, only numbers in the query search string (pursuant to the matching rules) will be considered when comparisons are made against entries in the catalog table.

If a query is issued which seeks a particular value for a cataloged attribute type, then the corresponding catalog table is searched for one or more EID numbers which corresponds to the requested search parameter. Thus, a database query can be issued for any particular attribute against the specific catalog table that is maintained for that attribute. The result of the database query is a list of EID numbers for objects that contains the queried attribute parameters. For example, a database query that requests every object in DIT 20 (FIG. 1) having a first name beginning with "John" will result in a search of the "First Name" catalog table (FIG. 6B) for a list of EID numbers which has a corresponding attribute "First Name" that matches with "John" (in this example, an EID value of "102" is returned). The resulting list of EID number(s) points to the entries in the attribute_store table 400 (FIG. 4) that contain the queried attribute.

The use of catalog tables in the present invention provides a significant advantage over systems that store objects within separate object class tables, such as the approach taken in FIGS. 2A–C. The advantage of the present invention arises because several different object classes may contain objects having a particular attribute type. In the present invention, a single catalog table indexes a particular attribute type, regardless of the object class of the objects having that attribute type. Thus, only a single table has to be searched to query against any particular object attribute type.

As an example, consider a query that requests every object in DIT 20 having an attribute type "State" with the value "NY". In the present invention, a search of a single catalog table, i.e., the state catalog table (FIG. 6E), finds two entries (EID 98 and EID 101) that match this query parameter. Note that these entries are members of different object classes, with entry 98 a member of object class "Department" and entry 101 a member of object class "Person". In the approach of FIGS. 2A–C, the same attribute type may be represented in many different object class tables since objects from different object classes may contain the same attribute type. In such a system, a query for a particular object attribute type may require multiple queries placed against each of the object class tables having a column for the queried attribute type. For the above example that searches for all objects having attribute value "NY" for the "State" attribute, each object class table having a column for this attribute (i.e., the department class table of FIG. 2B and the person class table of FIG. 2C) must be searched. Thus, in the present invention, the number of tables (i.e., catalog tables) that need to be queried for any particular search is a function of the number of attributes within the search terms. Whereas in the system of FIGS. 2A–C, the number of tables to be queried increases in correspondence to the number of object class tables that has a column for the queried attribute type.

Distinguished Names Table

In an embodiment of the invention, a table is maintained to track and identify the hierarchical relationship between objects in the DIT 20. This table is hereby referred to as the "distinguished name" table. In a present embodiment, the distinguished name table comprises three columns having the following characteristics:

| Column | Datatype | Constraint | Description |
| --- | --- | --- | --- |
| EID | number | Not null | Entry ID |
| RDN | Variable character-numeric string | Not null | Relative Distinguished Name |
| ParentDN | Variable character-numeric string | Not null | Parent Distinguished Name |

A distinguished name is a unique identifier that is used to refer to an entry unambiguously in the directory system. The distinguished name of an entry can be constructed by concatenating the relative distinguished name of an entry with the distinguished name of its parent entry. The relative distinguished name of an entry is the unique identifier of an entry within its own level in the DIT. The concatenation of the entry's relative distinguished name with its parent's distinguished name constructs an identifier that is unique within the entire directory system.

Figure 7:
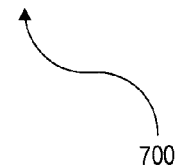
FIG. 7 illustrates a distinguished name table according to an embodiment of the invention.

FIG. 7 depicts an example of a distinguished name table 700 for the DIT 20 of FIG. 1. The EID column of the distinguished name table 700 contains the EID of an entry in the DIT 20. The RDN column contains the relative distinguished name of that entry. The ParentDN column contains the "parent" distinguished name for that entry (i.e., the absolute path of the parent entry in the DIT 20).

In the example of FIG. 7, the relative distinguished name for EID 100 is "JohnDoe," which is a concatenation of the attributes "First Name" and "Last Name" for entry 100. The relative distinguished name provides a unique identifier for objects at the particular level of the tree that the object resides on. Other representations for the relative distinguished name of an entry may be utilized within the scope of the present invention. For example, the common name ("cn") attribute type may be employed as the relative distinguished name in standard LDAP systems.

The parent distinguished name for entry 100 is "R&D.Oracle," which is the absolute path of entry 100's parent entry in DIT 20 (i.e., entry 99). Thus, the distinguished name (and absolute path) of entry 100 is "JohnDoe.R&D.Oracle," which is the concatenation of entry 100's relative distinguished name and parent distinguished name.

Note that the parent distinguished name column in the preferred embodiment of the invention stores the pathname of the parent entries in reversed order, so that the ParentDN of entry 100 is stored as "Oracle.R&D" (rather than "R&D.Oracle"). In other words, the highest corresponding level of the tree is listed first, followed by each next-lower level of the tree until the parent node is reached. This is somewhat counter-intuitive since the parent distinguished name is stored in reverse order to its representation in the absolute path for an entry. Many conventional systems do not even store the entire pathname of an entry or of the entry's parent entry. Instead, these other systems store only the specific object/entry identifier for the entry's parent. To derive the entire path of an entry, these other systems must necessarily follow a chain of object/entry identifiers for parent entries until the root node is reached, at which point the entire pathname can be constructed.

Maintaining the full path of the parent distinguished name for an entry in a reversed format provides a significant advantage when performing subtree searches in a DIT. A subtree search is a search of an entire tree of entries beneath an arbitrary node in the DIT. To perform a subtree search in the present invention, a wildcard character is utilized to narrow the field of entries in the system to particular ones beneath the node to be searched. As an example, consider a search for all entries in DIT 20 that are in Dept.="R&D" and Organization="Oracle" which has a Tel No.="555-1111". This is a subtree search because it searches for particular entries that are in the tree of entries beneath entry 99 in DIT 20. To perform this search in the present invention, the database query that is utilized may be stated in pseudocode form as follows: "Search for any entries in the DIT where Tel. No.='555-1111' and where ParentDN= 'Oracle.R&D*'," in which "*" is a wildcard symbol.

By storing the paths in reversed order in the distinguished names table 700, the range of entries that must be searched for the particular telephone number condition is considerably narrowed, since the indexed values can be used to find the matching entries. In conventional systems that store paths in a forward format, the same query may require the ParentDN portion be formatted as follows: "*R&D.Oracle," in which the wildcard symbol appears to the left of the parent distinguished name. Formatting the wildcard symbol to the beginning of the search string in this manner may necessitate a full scan of the stored data. With approaches that do not maintain a full path for the entries, this type of search query cannot be used without performing multiple steps to extrapolate the full pathname of the entry or its parent.

Protocol Compliant Data Storage

In an embodiment, the result of a query against an LDAP directory system returns the requested information in a format that is ready to be sent over a network (e.g., in LDAP-compliant formats). This can be implemented by maintaining a table similar to the attribute_store table of FIG. 4, but in which the "AttrVal" column contains appropriate raw or binary values for attributes of the system entries in the desired protocol compliant formats. To provide efficient query operations, the information stored for searching, such as the information that is maintained in catalog tables, are stored in an normalized format that is optimized for querying and searching. In this way, multiple entries for a particular attribute type may be stored in various different formats while still allowing full search capabilities against the stored data.

In an alternate embodiment, the protocol compliant formats for all attributes of an object can be stored in a single row of the attribute_store table. If a query requires all attributes of an object to be retrieved, this allows the access of a single row to result in the retrieval of all attributes for that object.

Operational Processes

The following are operational processes and methods utilized in an embodiment of the invention:

A. Define a New Attribute Type

Figure 8:
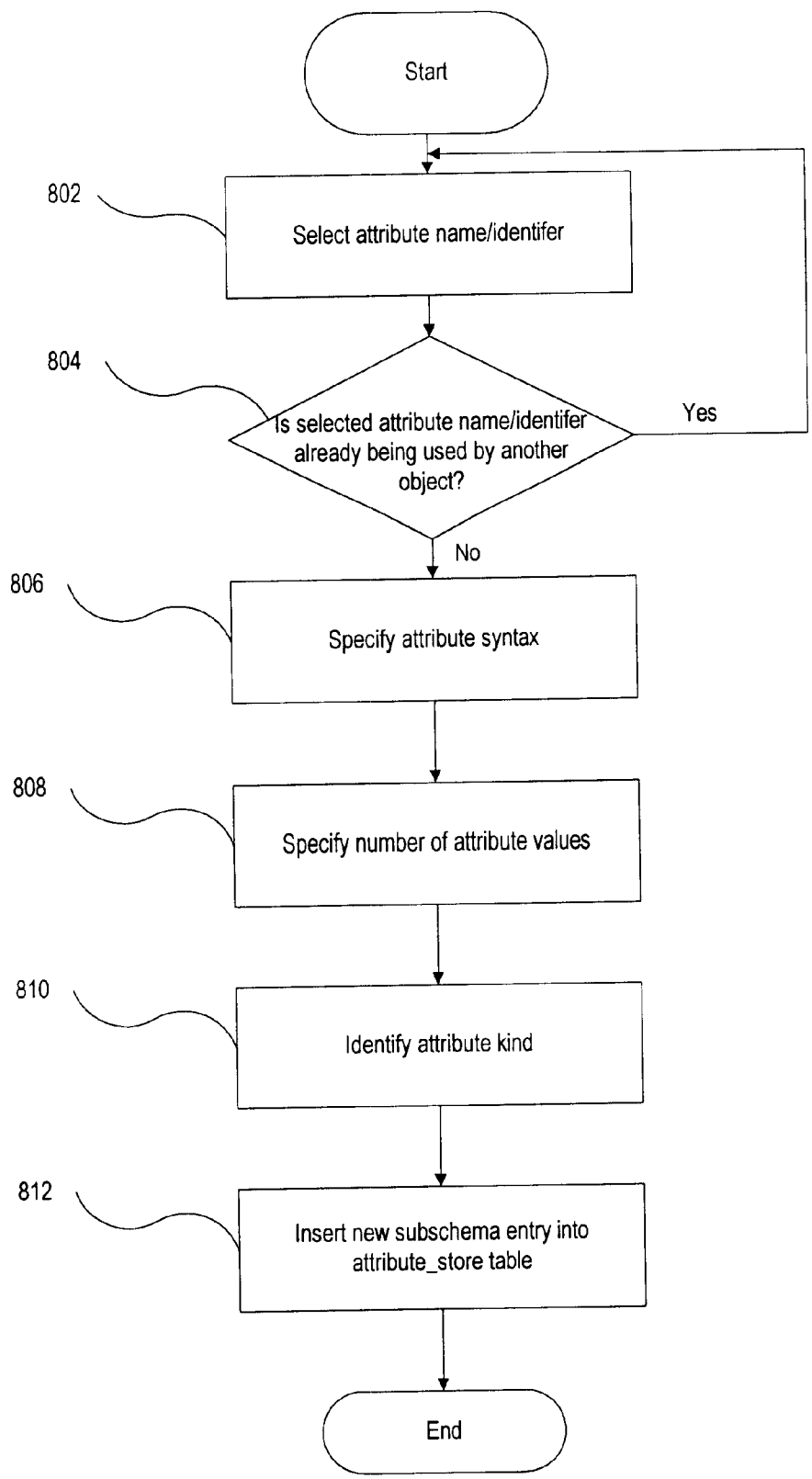
FIG. 8 is a flow diagram showing a process for defining a new attribute type.

A new attribute type can be defined by inserting a new subschema entry into the attribute_store table. Referring to FIG. 8, the following process actions are performed in an embodiment of the invention to define a new attribute type:

1. Select name and/or identifier for the new attribute type (802). If the selected name/identifier is already being used, then an alternate name/identifier must be selected (804).
2. Specify the attribute syntax for the new attribute type (806).
3. Indicate the number of values allows for the attribute type (808). In an embodiment, this action determines whether an attribute of this type shall have only one or whether it may have more than one value.
4. Indicate the attribute kind (e.g., whether the attribute type is operational or user) (810).
5. Insert new subschema entry into the attribute_store table having the defined parameters for the new attribute type (812). The subschema entry should have the correct EID value indicative of metadata for defining a new attribute type.

Other process actions can be additionally performed to define a new attribute type. For example, an additional act can be performed to indicate whether the new attribute type is a subtype of a previously defined attribute type. Subtypes of a previously defined attribute type inherit characteristics from its parent attribute type. Also, the forgoing process can perform an additional action to indicate the equality, ordering and/or substring matching rule(s) for the new attribute type.

B. Modify an Existing Attribute Type

Figure 9:
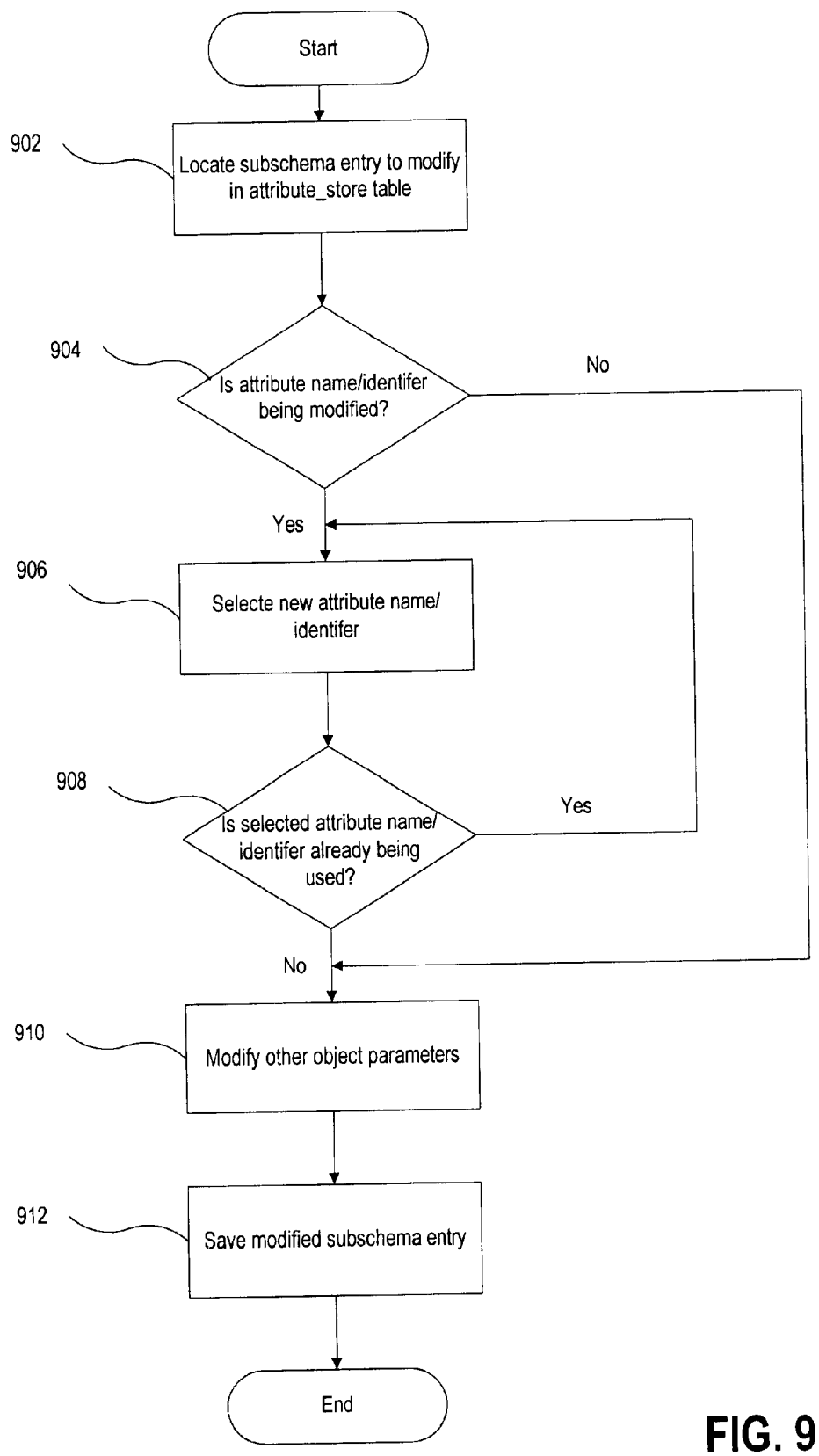
FIG. 9 is a flow diagram showing a process for modifying an attribute type.

An existing attribute type can be modified by editing the appropriate subschema entry in the attribute_store table. Referring to FIG. 9, the following process actions are performed in an embodiment of the invention to modify an existing attribute type:

1. Select the appropriate subschema entry to modify (902). The selected subschema entry is the row in the attribute_store table that defines the attribute type to be modified. The metadata rows in the attribute_store table that define an attribute type can be indexed in a separate catalog table to facilitate the selection of the appropriate subschema entry.
2. Determine whether the attribute name/identifier is being modified (904). If the attribute name/identifier is being modified, then select a new attribute name/identifier (906). The name/identifier for an attribute must be unique across the schema components. If the selected attribute name/identifier is already being used, then select an alternate attribute name/identifier (908).
3. Modify other attribute parameters (910). In an embodiment, a "single valued" attribute type can be modified to be a "multi-valued" attribute type, but the inverse is not permitted. In an alternate embodiment, a modification from "multi-valued" to "single valued" is permitted so long as all existing objects comprising the modified attribute type have only a single value for that attribute.
4. Save or commit modifications to the subschema entry in the attribute_store table (912).

C. Delete an Existing Attribute Type

Figure 10:
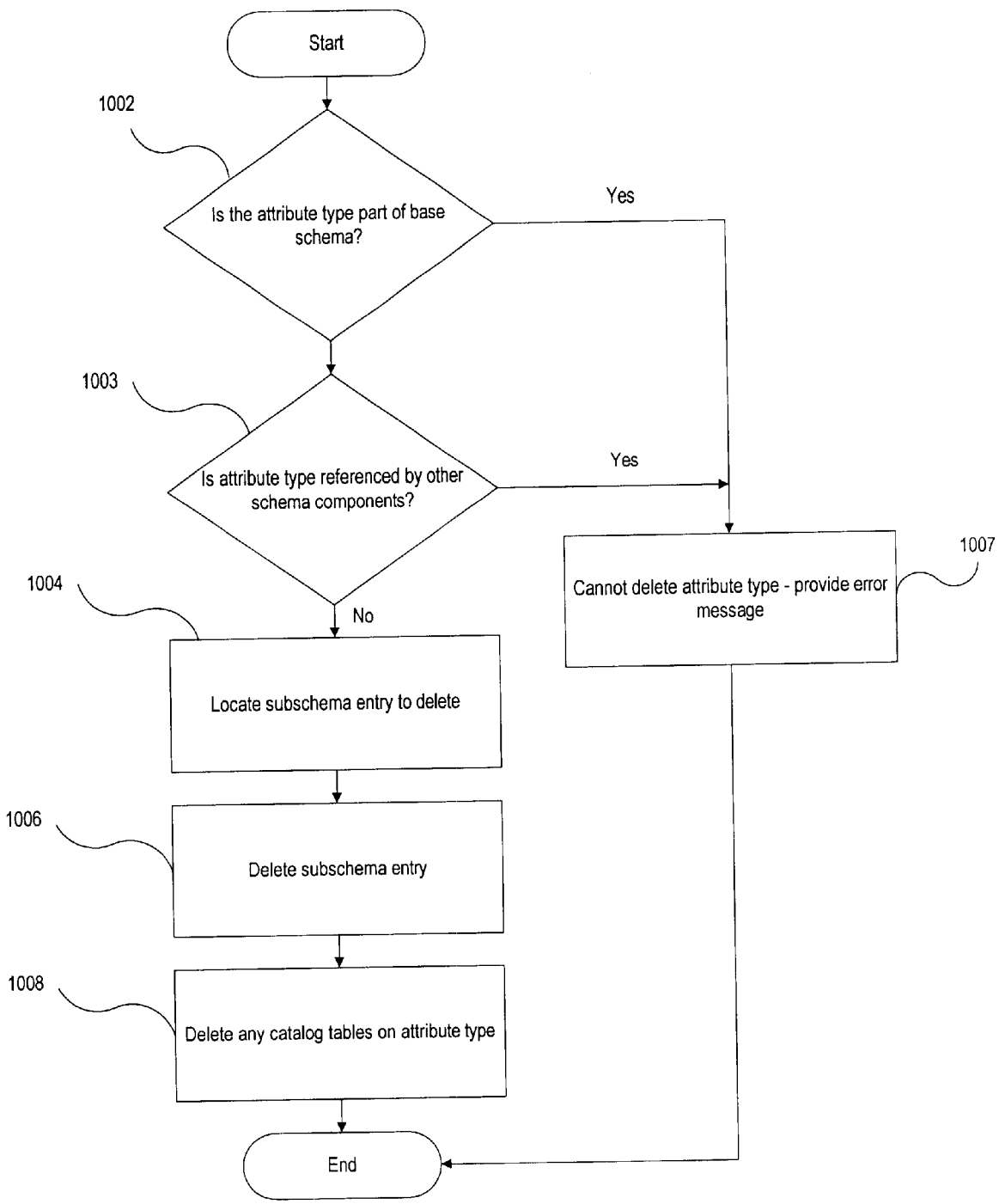
FIG. 10 is a flow diagram showing a process for deleting an attribute type.

An existing attribute type can be deleted by deleting the appropriate subschema entry in the attribute_store table. Referring to FIG. 10, the following process actions are performed in an embodiment of the invention to delete an existing attribute type:

1. Determine whether the attribute type to delete is part of the base schema (1002). Certain attributes can be defined as part of the base schema of the database and cannot be deleted from the system. If the attribute type is part of the base schema, provide an error message indicating that the attribute cannot be deleted (1007).
2. Determine whether attribute type to be deleted is referenced by any other schema components (1003). An attribute type cannot be deleted if it is referenced either directly or indirectly by any other schema component. If the attribute type is being referenced, provide an error message indicating that the attribute cannot be deleted (1007).
3. Locate the appropriate subschema entry in the attribute_store table that corresponds to the attribute type to be deleted (1004).
4. Delete subschema entry from the attribute_store table and commit the delete operation (1006).
5. Delete any catalog tables on the attribute type (1008). This may involve DDL operations to change the schema of the database.

D. Define a New Object Class

Figure 11:
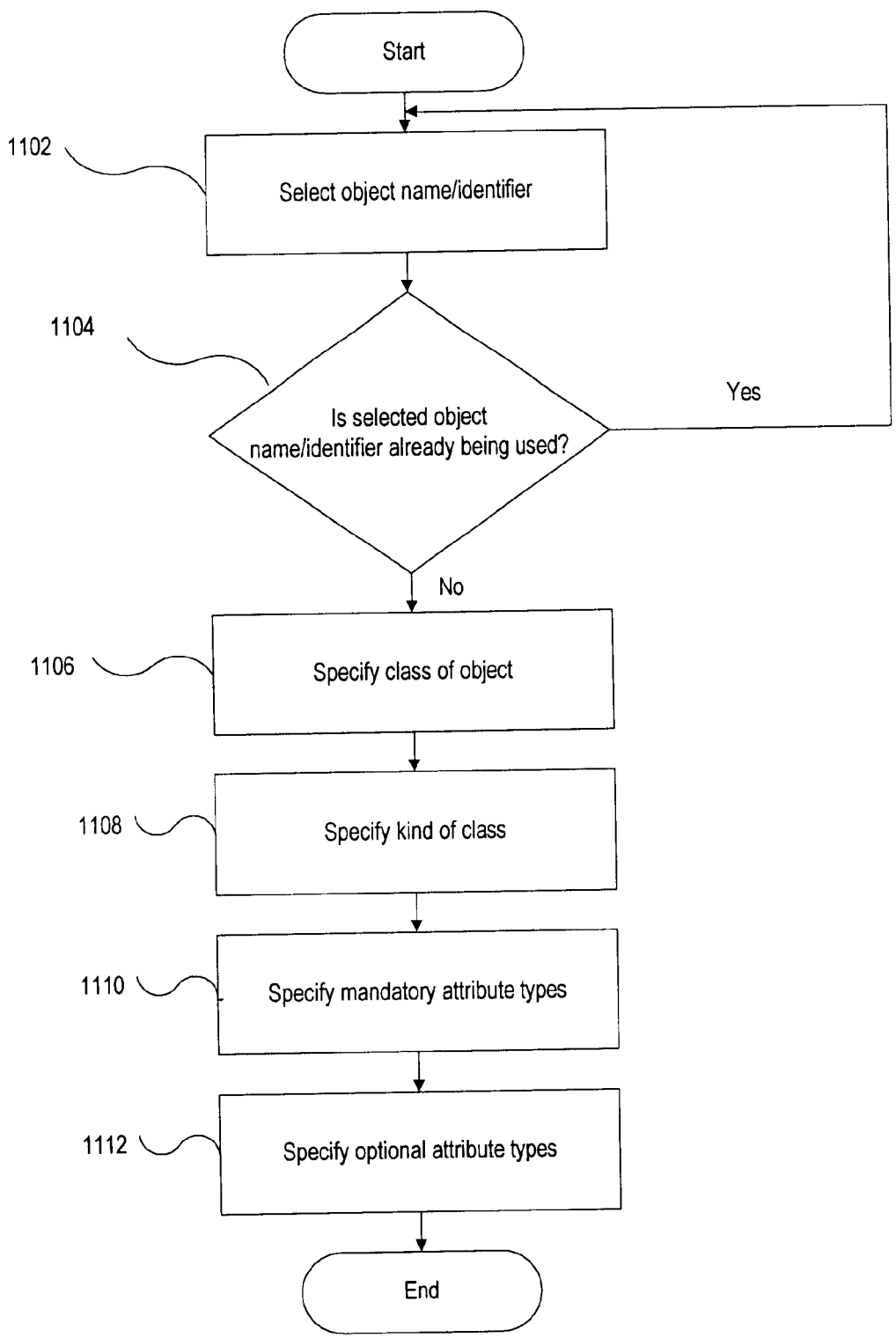
FIG. 11 is a flow diagram showing a process for adding a new object class.

A new object class can be defined by inserting a subschema entry into the attribute_store table that describes the new object class. Referring to FIG. 11, the following process actions are performed in an embodiment of the invention to define a new object class:

1. Select an object name and/or identifier for the new object class (1102). Determine whether the selected name/identifier for the object class is unique across all schema components (1104). If the object name/identifier is not unique, then select an alternate object name/identifier.
2. Indicate which classes this new object class is to be a subclass of (1106). Only abstract object classes should be superclasses of an abstract object class. The referenced schema components (e.g., superior object classes, mandatory and optional attributes) should already exist.
3. Indicate the AttriKind category for the object class being defined (1108).
4. List the mandatory attribute types that an entry of the object class shall contain (in addition to the mandatory attribute types of its superior object classes) (1110). An optional attribute used in one of the superior object classes can be made mandatory in the new object class.
5. List the optional attribute types that an entry of the object class may contain (in addition to the optional attributes of its superior object classes) (1112). A mandatory attribute used in one of the superior object classes can not be made optional in the new object class.

E. Modify an Existing Object Class

Figure 12:
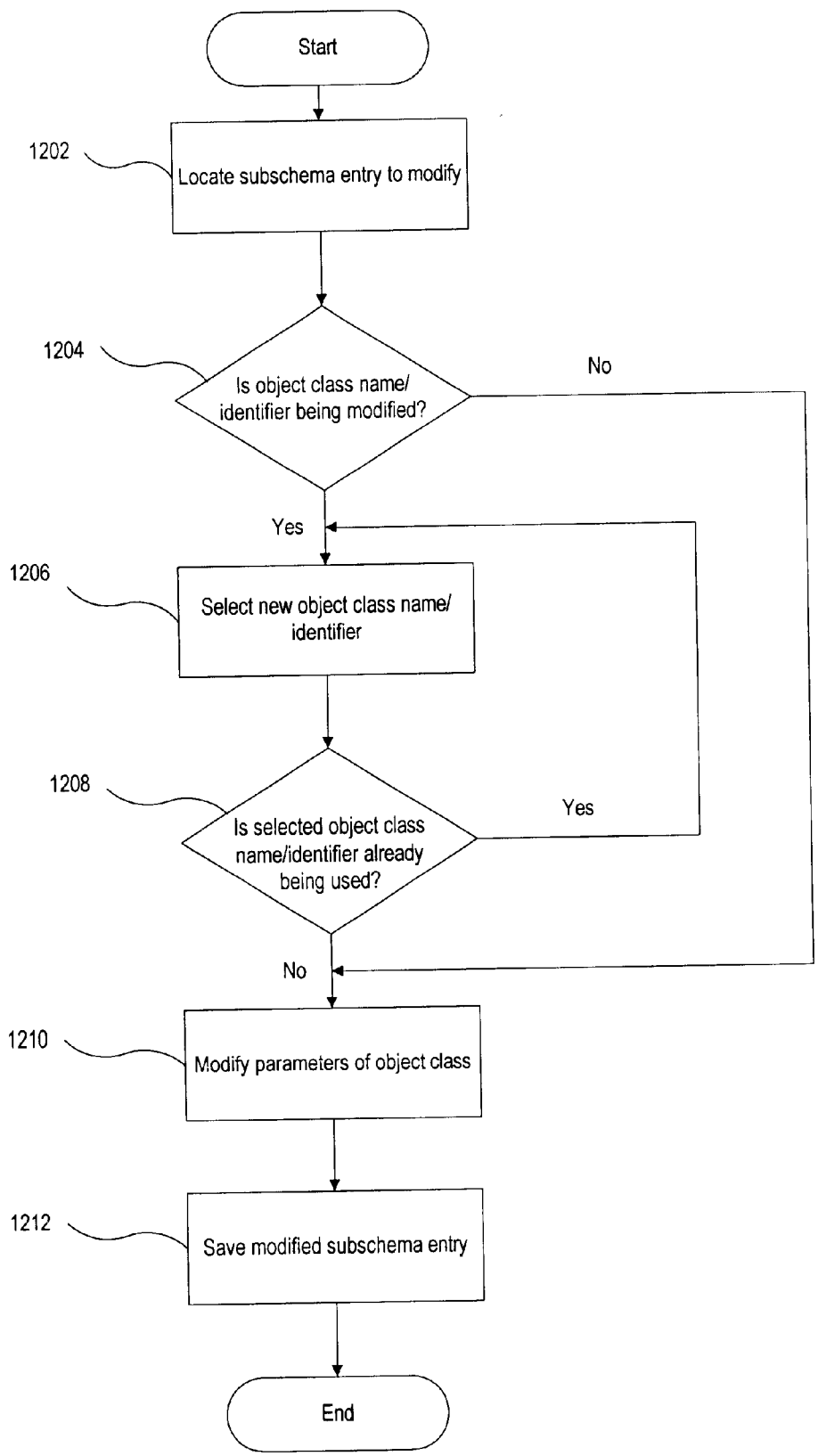
FIG. 12 is a flow diagram showing a process for modifying an object class.

An existing object class can be modified by editing the appropriate subschema entry in the attribute_store table. Referring to FIG. 12, the following process actions are performed in an embodiment of the invention to modify an existing object class:

1. Select the appropriate subschema entry to modify (1202). The selected subschema entry should be the row in the attribute_store table that defines the object class to be modified. The metadata rows in the attribute_store table that define an object class can be indexed in a separate catalog table to facilitate the selection of the appropriate subschema entry. If the definition of the object class has been registered (i.e., assigned a name of type object identifier), the object class is static and cannot be modified.
2. Determine whether the object class name and/or identifier is being modified (1204). If the object class name/identifier is being modified, then select a new object class name/identifier (1206). If the selected object class name/identifier is already being used, then select an alternate object class name/identifier (1208).
3. Modify parameters of the object class (1210). A mandatory attribute can be made optional. However, a new mandatory attribute cannot be added. New optional attributes can be added to the definition of the object class. In an embodiment, no attribute (mandatory or optional) can be removed. In an alternate embodiment, attributes can be removed so long as all existing members of the object class do not have values for the attributes to be removed. More superior object classes can be added to the object class. However, a superior object class can not be removed. An 'Auxiliary' object class can be converted to a 'Structural' or an 'Abstract' object class. An 'Abstract' object class can be converted to an 'Auxiliary' or a 'Structural' object class as long as the 'Abstract' object class is not being used as a superior object class of an 'Abstract' object class. The type of a 'Structural' object class cannot be changed.
4. Save or commit modifications to the subschema entry in the attribute_store table (1212).

F. Delete an Existing Object Class

Figure 13:
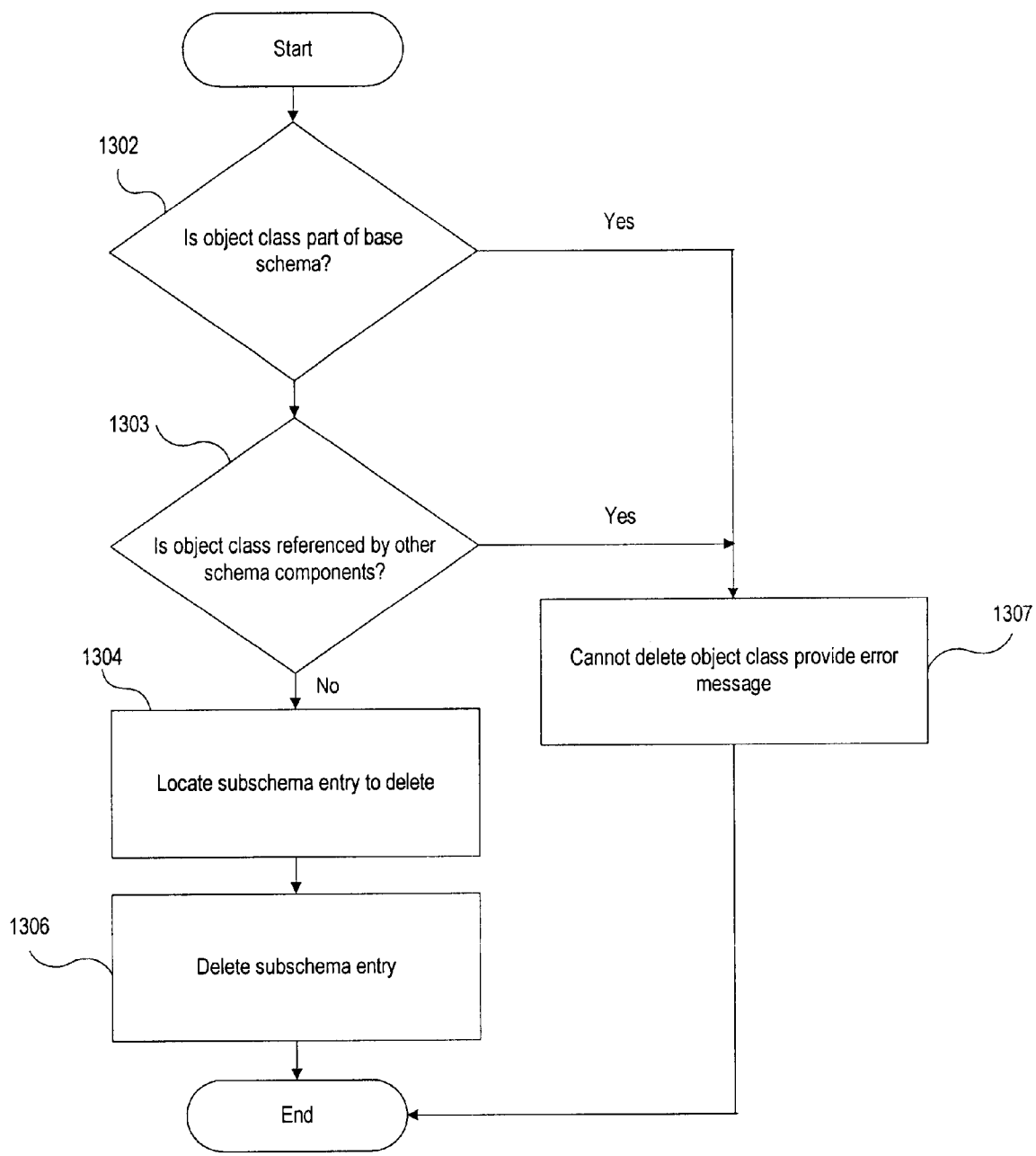
FIG. 13 is a flow diagram showing a process for deleting an object class.

An existing object class can be deleted by deleting the appropriate subschema entry in the attribute_store table. Referring to FIG. 13, the following process actions are performed in an embodiment of the invention to delete an existing object class:

1. Determine whether object class to be deleted is part of the base schema (1302). Certain object classes are defined as part of the base schema of the database and cannot be deleted from the system. If the object class is part of the base schema, provide an error message indicating that the object class cannot be deleted (1307).
2. Determine whether the object class to be deleted is referenced by any other schema components (1303). An object class cannot be deleted if it is referenced either directly or indirectly by any other schema component. If the object class is being referenced, provide an error message indicating that the object class cannot be deleted (1307).
3. Locate the appropriate subschema entry in the attribute_store table that corresponds to the object class to be deleted (1304).
4. Delete subschema entry from the attribute_store table and commit the delete operation (1306).

Automatic SQL Generation

The present invention provides a system and method for automatically generating a query statement in a database query language to search for particular objects or entries in a DIT that is stored within relational tables. In a preferred embodiment, the present invention provides a general purpose SQL generation engine that generates SQL for any LDAP search filter of arbitrary complexity.

The present invention can be configured to generate only a single SQL statement for any LDAP search filter, regardless of the complexity of the LDAP search filter. One significant benefit of generating only a single SQL statement is that the number of requests needed to perform the search filter is reduced, thus reducing the system and network overhead involved to perform the search. Additionally, since each separate SQL statement normally has inherent costs associated with its execution (e.g., the cost of performing a parsing operation), generating only a single SQL statement for a search filter reduces the total overhead cost when compared to the generation and execution of multiple SQL statements for a search filter.

The invention utilizes a series of templates to convert an arbitrary LDAP search filter into a single SQL statement. A base template provides the basic framework for generating the SQL statement. Additional templates are used to fill in specific portions of the base template. An embodiment of the base template is as follows:

SELECT distinquished_name.EID, store.AttrName, store.AttrVal
    FROM distinguished_name dn, attribute_store store
    WHERE
        [FilterCondition header]
        [FilterCondition]*
        [FilterCondition closing section]
        AND ([DNCondition])
        AND dn.EID=store.EID
        AND dn.EID>=:entryThreshold
        [AttrCondition]
    ORDER BY store.EID Any LDAP search filter can be converted into a single SQL statement based upon this base template. By utilizing other subtemplates to fill in portions of this base template, the exact SQL needed to perform the search can be generated. The items enclosed by the "[ ]" brackets are populated using additional templates.

Conceptually, this basic template can be broken into three distinct sections. The first section can be termed the "header section" to the base template. The header section comprises the following portion of the base template:

SELECT distinquished_name.EID, store.AttrName, store.AttrVal
    FROM distinguished_name dn, attribute_store store
    WHERE The header section of the template identifies the tables and table columns that are to be accessed to perform the SQL query. In an embodiment, the distinguished name table and the attribute_store table will always be accessed to execute the query. Thus, these two tables are specifically set forth in the base template itself.

The second section of the base template can be termed the "body section." The body section comprises the following portions of the base template:

[FilterCondition header]
[FilterCondition]*
[FilterCondition closing section]

This portion of the base template is populated with specific SQL statements that are directed to each of the search conditions in the LDAP search filter. The statement "[FilterCondition]" is a placeholder for the individual lines of SQL code that are directed to each search condition. The "*" symbol after "[FilterCondition]" indicates that the LDAP search filter may be complex enough to require multiple FilterConditions in the generated SQL statement. The FilterCondition placeholders are filled in recursively by one or more subtemplates that are used to address particular types of condition statements found in the LDAP search filter, as described in more detail below.

"[FilterCondition header]" and "[FilterCondition closing section]" refer to a matched set of values depending upon the initial operator of the filter. In an embodiment, if the initial operator is anything other than "NOT" (e.g., "AND", "OR", etc.), then [FilterCondition header] is replaced by "dn.EID IN ("and [FilterCondition closing section] is replaced by")". If the initial operator is "NOT", then [FilterCondition header] is replaced by "NOT EXISTS (SELECT 'X' From dual WHERE dn.EID IN ("and [FilterCondition closing section] is replaced by")".

The final section of the base template can be termed the "closing section." The closing section comprises the following portion of the base template:

AND ([DNCondition])
AND dn.EID=store.EID
AND dn.EID>=:entryThreshold
[AttrCondition]
ORDER BY store.EID This portion of the base template contains SQL statements that combine the results of the SQL statements from the body section with particular rows from the attribute_store and distinguished name tables. In addition, this portion of the base template contains statements to filter and order/sort the results of the search query.

"[DNCondition]" is replaced depending upon the type of search being performed. If a one-level search is being performed, [DNCondition] is replaced by "dn.parentdn like :bdn". If a subtree search is being performed, [DNCondition] is replaced with "(dn.rdn like :bdn OR (dn.rdn like :rdn AND dn.parentdn like :pdn))". "Parentdn" refers to the parent distinguished names column of the distinquished_names table. The bind variables ":rdn" ":bdn", and ":pdn" refer to the relative distinguished name, base distinguished name (i.e., distinguished name of the base of the search tree), and parent distinguished name respectively. For a subtree search, the term "dn.rdn like :bdn" matches all entries within the subtree. The term "(dn.rdn like :rdn AND dn.parentdn like:pdn)" matches the base entry of the search. Note that in a presently preferred embodiment, the distinguished name is stored in a reversed manner, so performing a subtree search results in a comparison statement such as "like 'Dept=Sales, Org.=Oracle%'" rather than "like '%Org.=Oracle, Dept.=Sales'", thus making effective use of indexes.

The statement "dn.EID>=:entryThreshold" isolates certain entries from the search. Selected EID numbers are utilized for special purposes in the attribute-store table. For example, EID "2" may be used to represent metadata entries in the attribute store table. These entries do not normally need to be returned in the course of a typical subtree or one-level search. Thus, if the system reserves EID numbers 0-999 for specialized uses, then the bind variable :entryThreshold would have a value of 1000, and only entries having an EID at or above that value would be returned by a normal subtree or one-level search.

[AttrCondition] is replaced by an empty string unless the search terms form a request for only certain attribute types to be returned. For example, if this type of search is being performed for attributes of type "u", then [AttriCondition] is replaced by "AND store.attrkind='u'" to limit the rows returned from the attribute_store table to user attributes.

The statement "dn.EID=Store.EID" provides a join operation between the distinguished names table and the attribute store table. The statement "ORDER BY store.EID" provides an ordering operation to the results of the search query to cluster the results by EID.

Figure 14A:
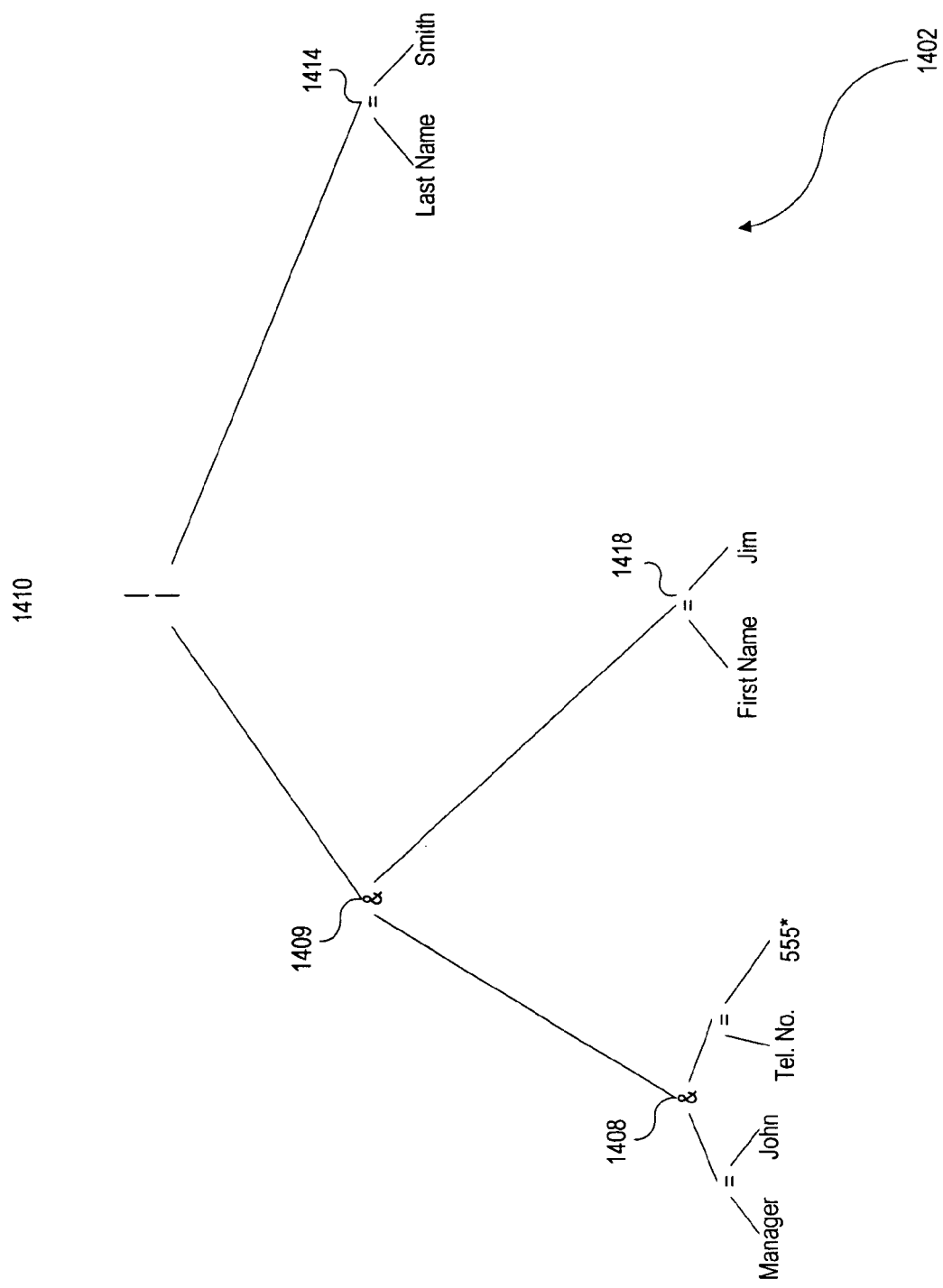
FIG. 14A illustrates an expression tree for an LDAP search filter.
Figure 15:
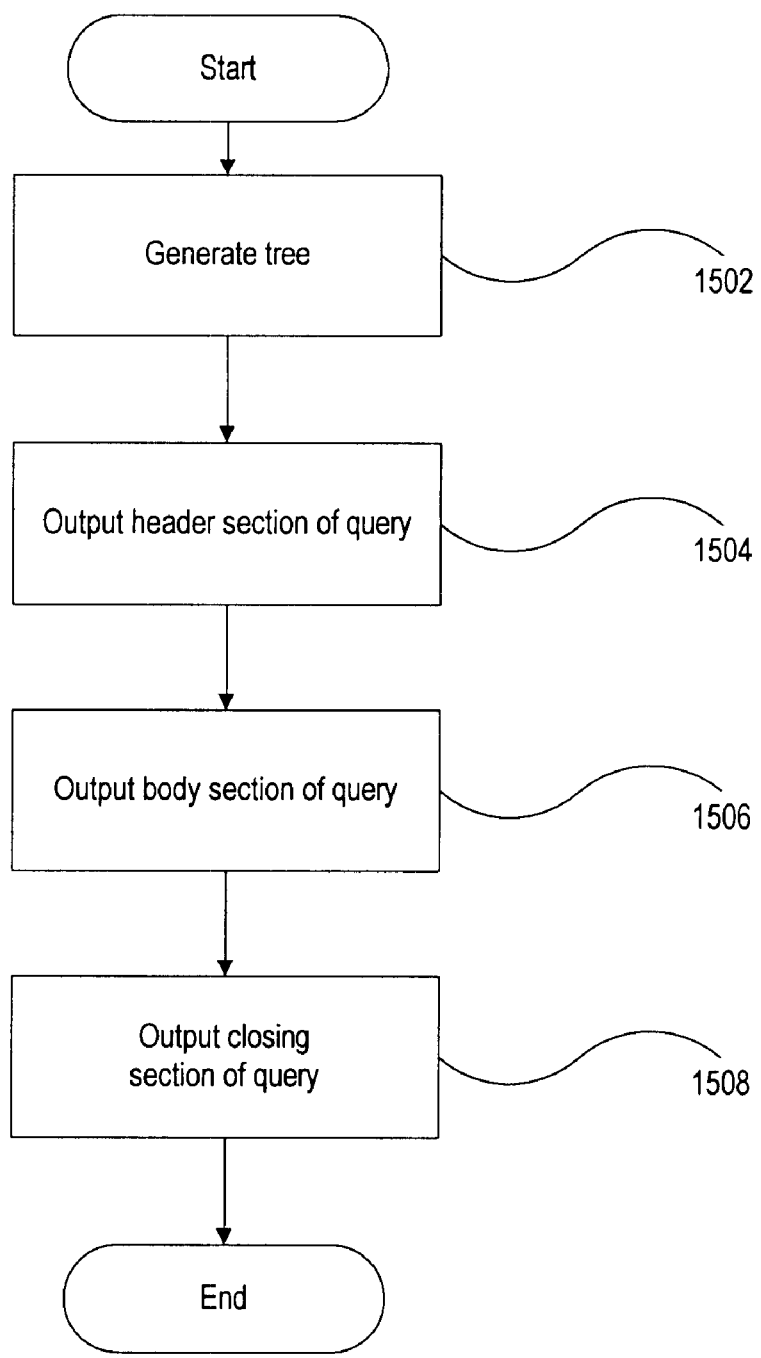
FIG. 15 is a flow diagram showing a process for generating a SQL statement for a search filter.

To illustrate this invention, consider a query request that seeks all entries in DIT 20 (FIG. 1) beneath entry 96 in which the entry has an attribute Last_Name equal to "Smith" or in which the entry has attribute Manager that begins with the name "John" and attribute Tel_No. that begins with the numbers "555" and attribute First Name equal to "Jim". Typical LDAP search filters utilize the following condition operators and their associated symbols: AND ("&"); OR ("|"); EQUAL ("="); LESS THAN OR EQUAL TO ("<="); GREATER THAN OR EQUAL TO (">="); NOT ("!"). Thus, the LDAP search filter for this search request may be expressed as follows:

(|(&(&(Manager="John*")(Tel No.="555*"))
(FirstName="Jim"))
  (LastName="Smith"))
Base: Org.=Oracle
Scope=subtree search To generate a SQL statement for this LDAP search filter, the base template set forth above is filled in. FIG. 15 provides an overview of the process for generating a SQL statement. Referring to FIG. 15, the following process actions are performed:

1. Parse the LDAP search filter and generate an expression tree for the search filter (1502). FIG. 14A depicts such an expression tree 1402 for the LDAP search filter of the present example. Each node of expression tree 1402 is a different condition operator from the LDAP search filter. Each branch from a condition operator is an expression modified by that condition operator.
2. Generate the header section of the SQL statement (1504). This action is described in more detail in FIG. 16 and its accompanying text.
3. Generate the body portion of the SQL statement (1506). This action is described in more detail in FIGS. 17A–B and their accompanying text.
4. Generate the closing sections of the SQL statement (1508). This action is described in more detail in FIG. 18 and its accompanying text.

Figure 16:
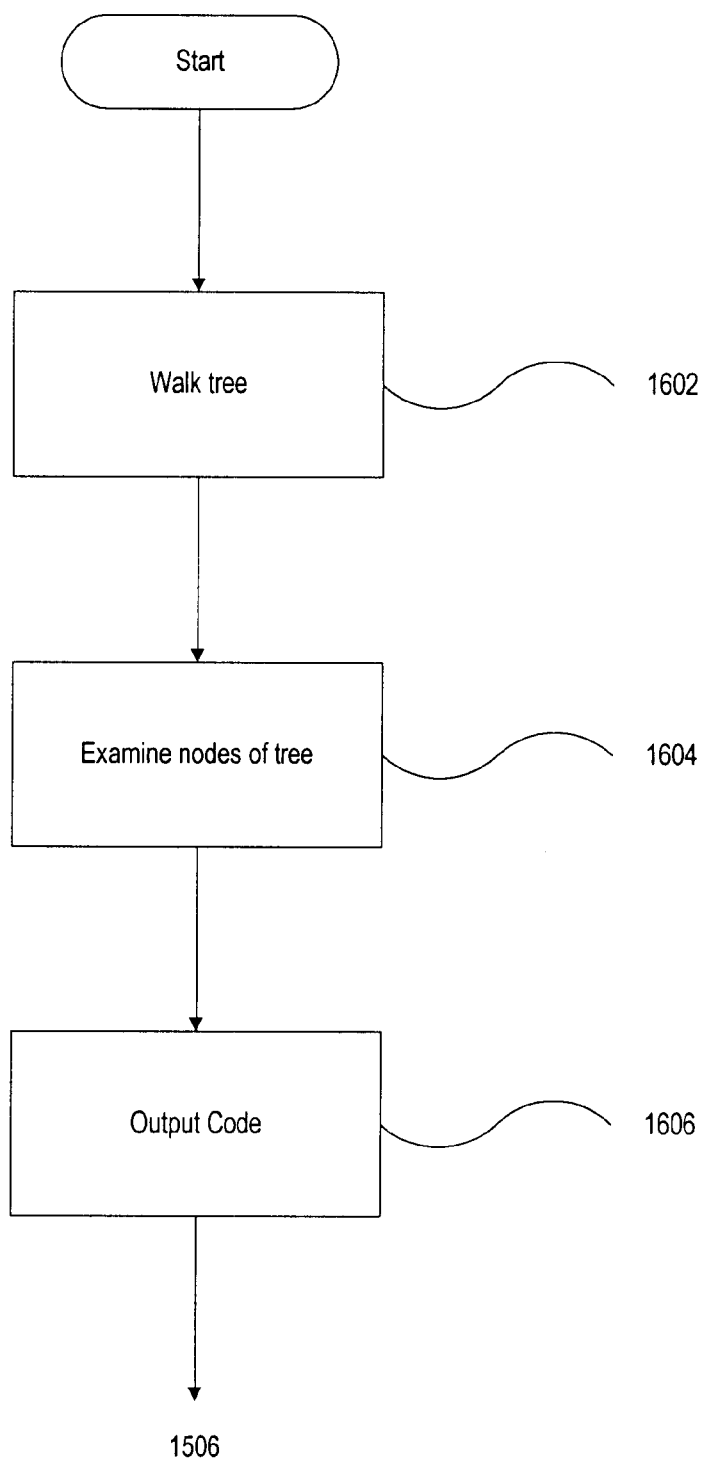
FIG. 16 is a flow diagram showing a process for generating the header section of a SQL statement for a search filter.
Figure 17A:
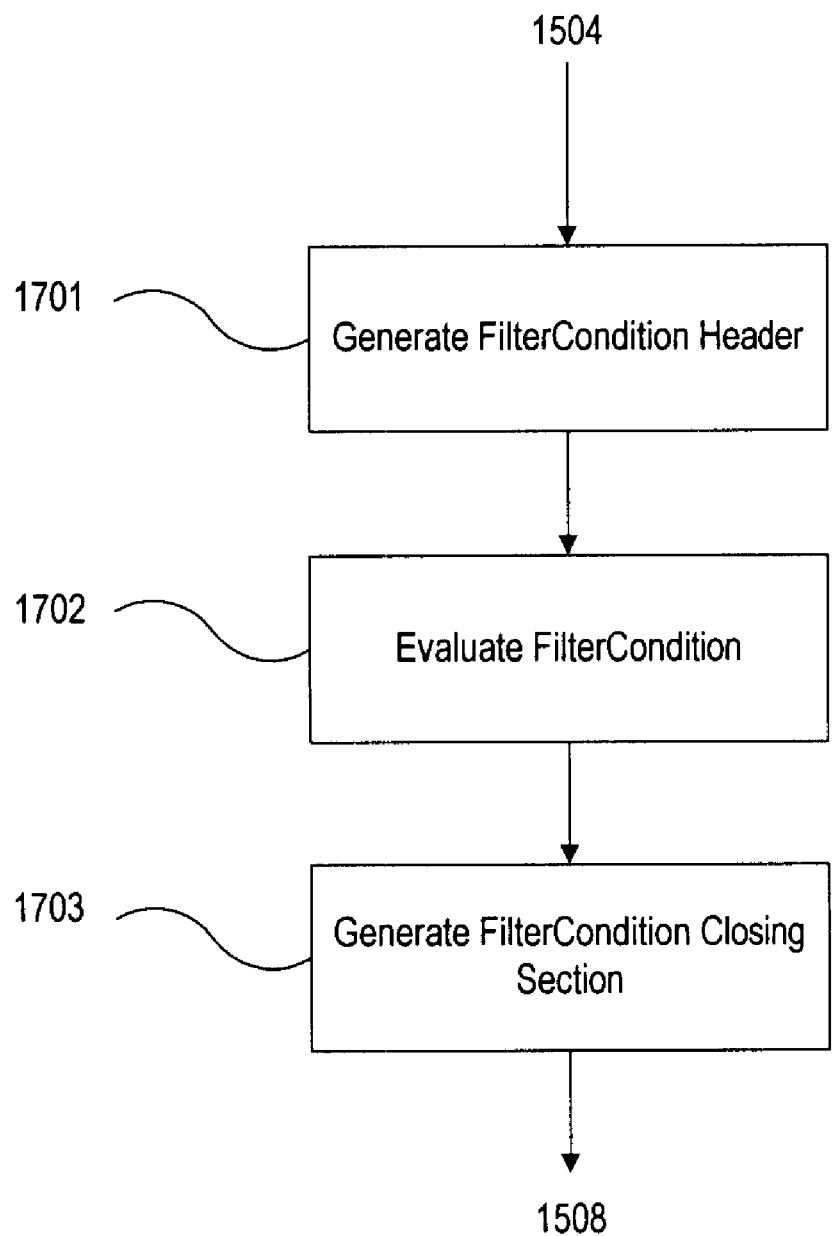

FIG. 16 depicts a flowchart of the process to output the header section of the SQL statement. The expression tree 1402 is walked (1602) and the nodes are examined (1604) to identify the tables that have to be accessed to perform the query. In an embodiment, the attribute_store and distinguished_names tables are always accessed. Thus, these two tables will always appear in the generated SQL statement. In the present example, the following header section is generated:

SELECT distinguished_name.EID, store.AttrName, store.AttrVal
  FROM attribute_store store, distinguished_name dn
  WHERE FIGS. 17A and 17B depict flow diagrams of the process to generate the body section of the SQL statement. The process examines the nodes of the expression tree 1402 and utilizes specialized templates to generate the SQL that performs the specific query operations that match the terms of the search filter.

Referring to FIG. 17A, the first action of the process is to generate the [FilterCondition header] section (1701), as described in more detail above. The filter node(s) of the expression tree 1402 are then evaluated to generate the appropriate SQL for the query (1702). In an embodiment, evaluating the filter nodes comprises the act of walking the nodes of expression tree 1402. Alternatively, the results of the tree walk from process action 1602 of FIG. 16 are stored in memory, and process action 1702 merely examines information about the nodes that are maintained in memory. Once the appropriate SQL has been generated, the [FilterCondition closing section] is generated (1703).

FIG. 17B depicts the process flow of a process 1702 for evaluating the filter node(s) of the expression tree and generating SQL corresponding to the filter conditions of the LDAP filter. Process 1702 is a recursive process, which can be recursively called from within itself to execute multiple times. Operation 1704 indicates the beginning of the process 1702 for evaluating a filter node, and operation 1709 indicates the end of the process 1702.

Optional optimizations may be performed to enhance the processing of the invention (1706). One optimization is to examine the LDAP filter to remove relatively simple/ common boolean subexpressions from the filter. For example, the expression "!(!(a))" can be more simply represented as "(a)". Common/simple subexpression elimination is helpful in reducing the complexity of the resulting [FilterCondition] SQL statement, especially in the multiple NOT scenario. To facilitate the explanation of the invention, it is assumed that the present illustrative example does not have any search terms corresponding to this optimization, and thus process action 1706 will not be described in the below explanation.

At process action 1707, the filter node is evaluated to determine whether the node is part of a "base condition". According to a present embodiment, a base condition is a contiguous section of an expression tree that is expanded as large as possible while containing only zero or one of the following condition operators: "&" or "|". In an alternate embodiment, a base condition is a contiguous section of an expression that contains zero or more of the following condition operators: "Not", "Presence", "NotPresence", "&", or "|".

One aspect of an embodiment of the invention is directed to generating SQL for an LDAP query in which the generated SQL comprises a hybrid approach to aggregating/ filtering data from multiple database tables. In particular, the generated SQL provides a balanced approach to using database "JOIN" operations with the use of other database aggregation/filtering operations, such as the "INTERSECT" and "UNION" operations. In many database systems, the JOIN operation provides a different level of efficiency than the INTERSECT or UNION operations, depending upon the particular situations in which these operations are utilized. Thus, the JOIN operation is more appropriately used on some circumstances, while the INTERSECT or UNION operations provides more efficiency in other circumstances.

When using an embodiment of the present invention implemented on an Oracle 8 database system, it is preferred that the JOIN operation is used to aggregate data at lower levels of a query while the INTERSECT and UNION operations are used to aggregate data once the volume of data to aggregate has already been reduced by the JOIN operations. In the present embodiment, this is accomplished by using the JOIN operation to aggregate results within a base condition. The INTERSECT and UNION operations are used to aggregate the results between two base conditions, between two groups of base conditions, or between one base condition and another group of base conditions. Thus, setting the parameters of a "base condition" alters the mix between the use of JOIN operations and the use of other aggregation operations in the generated SQL.

Figure 14B:
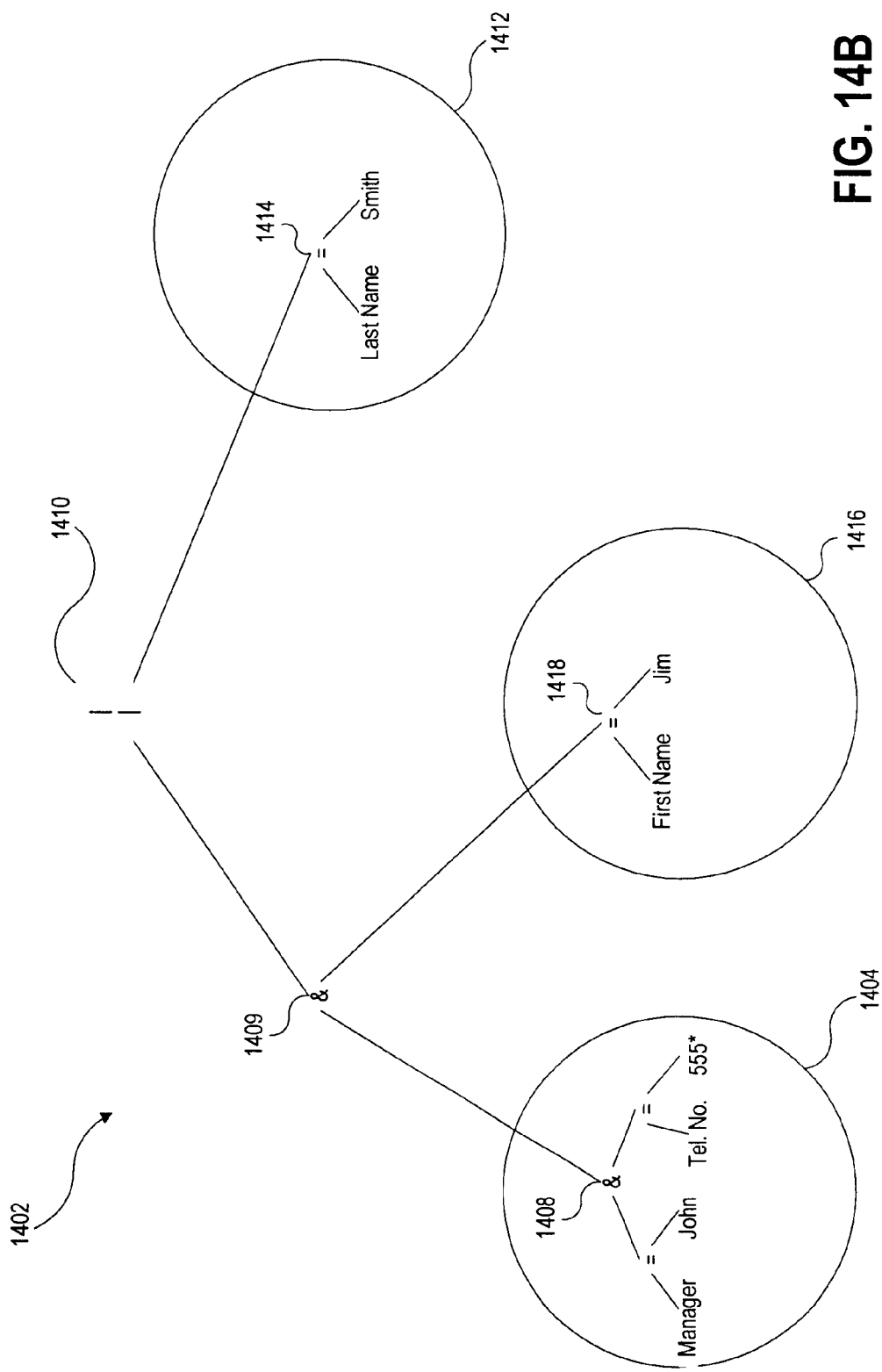
FIG. 14B illustrates the expression tree of FIG. 14A with base conditions circled.

FIG. 14B is a revised illustration of FIG. 14A showing circled areas that correspond to base conditions according to the presently preferred embodiment. Circled area 1404 from FIG. 14, which is a subtree section that is rooted at node 1408, comprises a base condition since this tree section has only one condition operator from the above-delineated list ("&" at node 1408). If this tree section is expanded by moving up one node, becoming a subtree rooted at node 1409, then this expanded subtree section cannot be a base condition since it contains two of the delineated condition operators (i.e., "&" at node 1408 and "&" at node 1409). This base condition cannot be contracted down any further since it would not therefore encompass the largest possible tree section with only zero or one of the listed condition operators. Thus, circled area 1404 is a base condition since it is a contiguous section of tree 1402 that has been expanded as wide as possible without containing more than one of the listed condition operators. A tree can have a plurality of base conditions. For example, circled area 1412 from FIG. 14, which is a subtree rooted at node 1414, is also a base condition since it has been expanded as large as possible without containing more than one of the delineated condition operators. Circled area 1416, which is a subtree rooted at node 1418, is another base condition.

The significance of a tree section being a base condition is that different templates are utilized in this process depending upon whether and what type of base condition is encountered. If the node under examination is part of a base condition, then the appropriate base condition template is output for that tree section rooted at that node. If a base condition is not found, this indicates that two or more base conditions exist beneath the node under examination. Each of the branches beneath the node under examination is considered a "subtree condition." Each subtree condition encompasses one or more base conditions. The subtree condition itself may have branches that are subtree conditions.

Referring back to FIG. 17B, the filter node is evaluated to determine whether it is part of a base condition (1707). In the present example, the first node under examination in tree 1402 is node 1410. Examination of node 1410 reveals that it is not part of a base condition, since the subtree section rooted at node 1410 has more than one node having either "&" or "|". Since node 1410 is not part of a base condition, it is recognized that there are two or more subtree sections beneath node 1410 that must be further evaluated by process 1702.

A "start group marker" is generated to indicate that the process will be recursively calling itself to generate SQL for the search conditions (1710). In an embodiment, the start group marker is an open parenthesis "(". At the end of the process, a corresponding "end group marker" will be generated for each "start group marker." In an embodiment, the "end group marker" is a closed parenthesis ")".

The parent filter node type to the subtree conditions is examined to determine whether it is an "AND" or "OR" operator (1711). This determines whether the "INTER- SECT" or "UNION" operation will be utilized by the generated SQL as the conjunction marker to aggregate the results of two subtree conditions. "UNION" is the SQL equivalent of the "|" condition operator. "INTERSECT" is the SQL equivalent of the "&" operation. In the present example, the parent filter node type (i.e., for node 1410) is a "|" operator, thus the UNION operation will be used as the conjunction marker between the two subtree conditions beneath node 1410.

At process action 1712, each of the subtree conditions is filled in by recursively going to a child node and restarting the filter node evaluation process 1702. Thus, the process will recursively return back to process action 1704 to evaluate the subtree section rooted at node 1414 (which is a child node of node 1410) to generate SQL for this subtree section. Once the evaluation of the subtree section rooted at node 1414 has completed, the process will return back to process action 1704 to evaluate the subtree section rooted at node 1409.

With respect to the subtree condition rooted at node 1414, node 1414 is evaluated (1704) by process 1702 to determine if it is part of a base condition (1707). The circled portion 1412 of tree 1402 corresponds to the subtree section that is examined during this process action. This subtree section is a base condition since there are zero condition operators of type "&" or "|" in the tree section. Thus, the appropriate base condition template is output for this base condition (1708).

Each type of base condition has a corresponding template that is utilized. For a base condition rooted with the "=" condition operator, the following template is employed in an embodiment of the invention:

SELECT EID FROM <CatalogTable>
WHERE
CatalogTable.AttrVal=value of search term Specific catalog tables may be accessed to satisfy particular search parameters in the LDAP search filter. In the present example, the terms of the LDAP search filter contain the following attribute types: "Manager", "Tel. No.", "First Name", and "Last Name". Thus, the SQL query for this search filter will access catalog tables that correspond to these attribute types. For the purposes of this example, the catalog table for attribute type "Manager" will be referred to as "ct_manager," the catalog table for attribute type "Tel. No." will be called referred to as "ct_tel," the catalog table for the attribute type "Last Name" will be referred to as "ct_lastname," and the catalog table for the attribute type "First Name" will be referred to as "ct_firstname."

WHERE at1.EID=at2.EID
And at1.AttrVal like 'SEARCHVALUE1'
And at2.AttrVal like 'SEARCHVALUE2'

An embodiment of a template for a base condition rooted with a "|" is as follows:

SELECT at1.EID
FROM CatalogTable1 at1
WHERE at1.AttrVal like 'SEARCHVALUE1'
UNION
SELECT at2.EID
FROM CatalogTable2 at2
WHERE at2.AttrVal like 'SEARCHVALUE2'

An embodiment of a template for a base condition for a "not" condition is as follows:

SELECT dn.EID
FROM distinguished_names dn, <CatalogTable> at1
WHERE at1.AttrVal (+) like 'Value of search term'
AND dn.EID=at1.EID (+)
AND at1.EID is NULL An embodiment of a template for a base condition for a "presence" condition is as follows:

SELECT at1.EID
FROM <CatalogTable> at1

An embodiment of a template for a base condition for a "NotPresence" condition is as follows:

SELECT dn.EID
FROM distinguished-names dn, <CatalogTable> at1
WHERE dn.EID=at1.EID (+)
AND at1.EID is NULL Once the base condition template has been generated, the process to evaluate a filter condition ends (1709), and the process 1702 returns back to the calling process action 1712. Thus, after node 1414 has been evaluated, the SQL that has been generated to this point is as follows:

```
SELECT distinguished_name.EID,              /*header section */
store.AttrName, store.AttrVal
    FROM attribute_store store, distinguished_name dn
    WHERE
    dn.EID IN (              /* FilterCondition header */
    ( /* "start group marker" */
        SELECT EID FROM ct_lastname at3     /* template for subtree */
            WHERE at3.AttrVal = 'Jim'        /* rooted at node 1414 */
```

If the value of the search term contains a wildcard symbol, then the above template is changed to the following:

SELECT EID FROM <CatalogTable>
WHERE
CatalogTable.AttrVal like 'value of search term'

An embodiment of a template for a base condition rooted with an "&" is as follows:
SELECT at1.EID
FROM CatalogTable1 at1, CatalogTable2 at2

A determination is then made whether there are any other child nodes to examine (1716). If so, then the appropriate conjunction marker is generated and added to the previously generated SQL (1714). In the present example, the other child node 1409 still has to be examined, thus the previously identified conjunction marker "UNION" is output and added to the previously generated SQL as follows:

```
SELECT distinguished_name.EID,            /*header section */
    store.AttrName, store.AttrVal
        FROM attribute_store store, distinguished_name dn
        WHERE
        dn.EID IN (    /* FilterCondition header */
( /* "start group marker" */
        SELECT EID FROM ct_lastname at3    /*template for subtree */
            WHERE at3.AttrVal = 'Jim'       /*rooted at node 1414 */
        UNION           /* conjunction marker */
```

The process then returns to process action 1712 to recursively evaluate the other child node 1409. With regard to the subtree condition rooted at node 1409, node 1409 is evaluated (1704) to determine if it is the root node for a base condition (1707). Since the subtree rooted at node 1409 contains more than one of the condition operators "&" or "|", this subtree section is not a base condition. Therefore, this indicates that there are multiple subtree conditions beneath node 1409 that must be further evaluated. The process proceeds to generate another "start group marker" (1710):

no condition operators of type "&" or "|" in this tree section. As such, process action 1708 is executed to output the appropriate base condition template, which is added the previously generated SQL. Once the base condition template has been generated, the process to evaluate a filter node ends (1709), and the process returns back to the calling process action 1713. At this point, the generated SQL for this example is as follows:

```
SELECT distinguished_name.EID,            /*header section */
    store.AttrName, store.AttrVal
        FROM attribute_store store, distinguished_name dn
        WHERE
        dn.EID IN (     /* FilterCondition header */
        ( /* "start group marker" */
            SELECT EID FROM ct_lastname at3    /* template for subtree */
                WHERE at3.AttrVal = 'Jim'       /* rooted at node 1414 */
        UNION           /* conjunction marker */
        ( /* "start group marker" */
```

Node 1409 has two child nodes that must be evaluated further. A child node 1418 roots a first subtree section beneath node 1409. A second child node 1408 roots a second subtree section beneath node 1409. The parent filter node type to these two subtree sections is a "&" operator, thus the conjunction marker for this subtree group is "INTERSECT" (1711).

Since the parent filter node type is an "AND", the process proceeds to process action 1713 to recursively evaluate the filter nodes for each subtree condition. With respect to the subtree rooted at node 1418, node 1418 is evaluated (1704) to determine if it is the root node for a base condition (1707). The circled portion 1416 of tree 1402 corresponds to the subtree area that is examined during this particular process action. This subtree area is a base condition since there are

```
SELECT distinguished_name.EID,            /*header section */
    store.AttrName, store.AttrVal
        FROM attribute_store store, distinguished_name dn
        WHERE
        dn.EID IN (     /* FilterCondition header */
        ( /* "start group marker" */
            SELECT EID FROM ct_lastname at3    /* template for subtree */
                WHERE at3.AttrVal = 'Jim'       /* rooted at node 1414 */
        UNION           /* conjunction marker */
        ( /* "start group marker" */
            SELECT EID FROM ct_firstname at2    /* template for subtree */
                WHERE at2.AttrVal = 'Jim'       /* rooted at node 1418 */
```

An evaluation is then made as to whether there are any other child nodes of parent node 1409 to examine (1715). In the present example, the subtree rooted at node 1408 still needs to be examined. Thus, the appropriate conjunction marker is generated (1718), and the process proceeds back to process action 1713 to recursively evaluate filter node 1408. The subtree rooted at node 1408 is evaluated (1704) to determine if it is the root node for a base condition (1707). The circled portion 1404 of tree 1402 corresponds to the subtree area that is examined during this process action. This subtree area is a base condition since there is only one condition operator of type "&" or "|" in this tree section. As such, process action 1708 is executed to generate the appropriate template for this base condition:

```
SELECT distinguished_name.EID,           /*header section */
store.AttrName, store.AttrVal
    FROM attribute_store store, distinguished_name dn
    WHERE
    dn.EID IN (          /* FilterCondition header */
    ( /* "start group marker" */
        SELECT EID FROM ct_lastname at1      /* template for subtree */
            WHERE at1.AttrVal = 'Smith'      /* rooted at node 1414 */
        UNION              /* conjunction marker */
        ( /* "start group marker" */
        SELECT EID FROM ct_firstname at2     /* template for subtree */
            WHERE at2.AttrVal = 'Jim'        /* rooted at node 1418 */
        INTERSECT     /* conjunction marker */
        SELECT EID FROM ct_manager at3, ct_tel at4  /* template for    */
        WHERE at3.AttrVal like 'John%'               /* subtree rooted  */
        AND at4.AttrVal like '555%'                  /* at node 1408    */
        AND at3.EID=at4.EID
```

The process then returns back to process action 1713. Since there are no more child nodes to examine, an "end group marker" is generated to correspond to each previously generated "start group marker" (1717). The [FilterCondition closing section] is then generated to complete the body section of the SQL statement (1703 from FIG. 17A). At this point, the generated SQL statement is as follows:

```
SELECT distinguished_name.EID,                /*header section */
store.AttrName, store.AttrVal
    FROM attribute_store store, distinguished_name dn
    WHERE
    dn.EID IN (          /* FilterCondition header */
        (  /* start group marker */
            SELECT EID FROM ct_lastname at1      /* template for subtree */
                WHERE at1.AttrVal = 'Smith'      /* rooted at node 1414 */
            UNION           /* conjunction marker */
            ( /* start group marker */
                SELECT EID FROM ct_firstname at2      /* template for subtree */
                    WHERE at2.AttrVal = 'Jim'         /* rooted at node 1418 */
                INTERSECT /* conjunction marker */
                SELECT EID FROM ct_manager at3, ct_tel at4  /* template for    */
                WHERE at3.AttrVal like 'John%'                /* subtree rooted */
                AND at4.AttrVal like '555%'                   /* at node 1408   */
                AND at3.EID=at4.EID
        )  /* end group marker */
    )      /* end group marker */
)          /* FilterCondition closing section */
```

Figure 18:
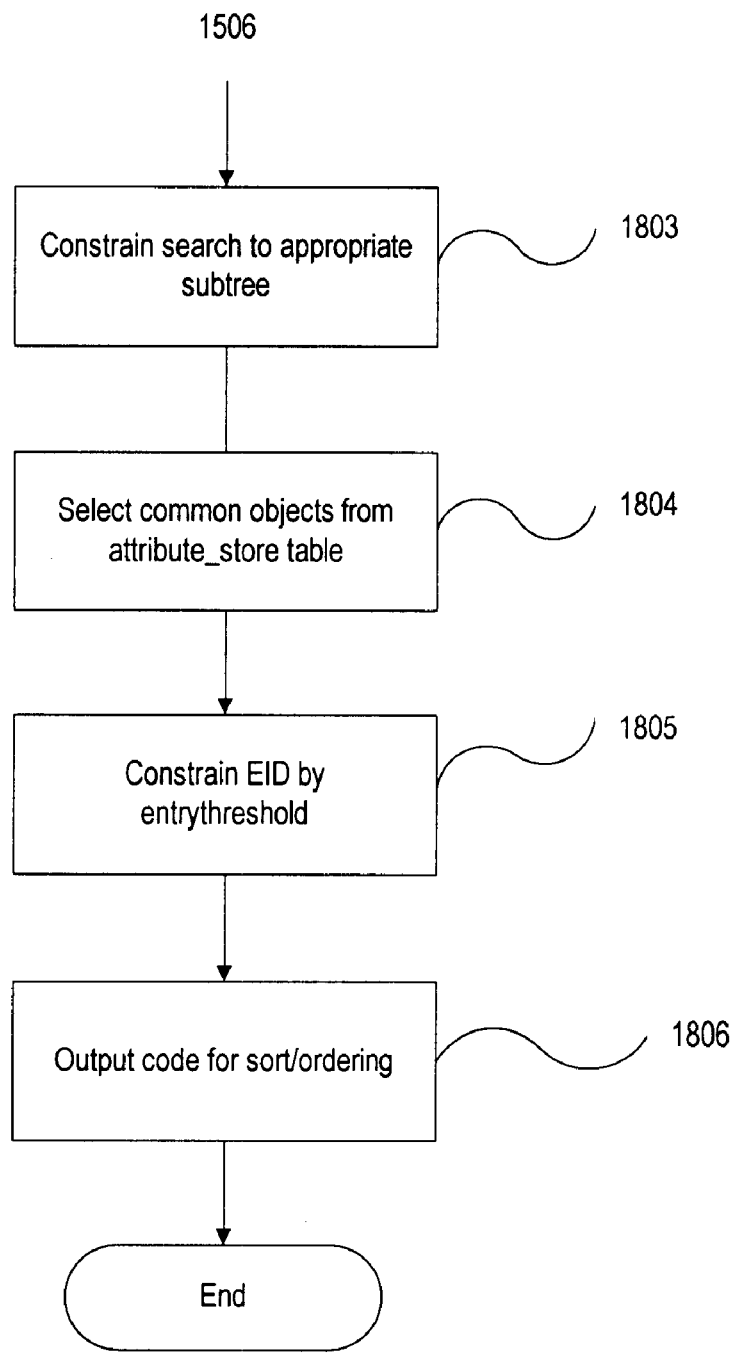
FIG. 18 is a flow diagram showing a process for generating the closing section of a SQL statement for a search filter.

FIG. 18 is a flowchart showing more details of the process to generate the closing section of the base template. The first action is to generate SQL to constrain the subtree search to the appropriate tree of entries (1803). The next action is to output SQL to select the entries from the attribute_store table that match the EIDs from the distinguished names table (1804). The next action is to output SQL to constrain the list of EID numbers to those at or above the entryThreshold variable (1805). The final action is to output SQL for sorting/ordering the results (1806).

In an embodiment, the template for the closing section of the SQL query is as follows:

```
AND [DNCondition]
AND store.EID=dn.EID
```

```
AND dn.EID >=:entryThreshold
ORDER BY store.EID
```

Filling in this template with the appropriate information from the example produces the following closing section:

```
AND (dn.parentdn like :bdn OR (dn.rdn like :rdn
AND dn.parent dn like :pdn))
AND dn.EID=Store.EID
AND dn.EID >=:entryThreshold
```

```
ORDER BY store.EID
```

The bind variables are replaced with the appropriate distinguished names values prior to execution. Thus, the generated SQL for this example, including the header, body, and closing sections is as follows:

```
SELECT distinguished_name.EID,              /*header section */
store.AttrName, store.AttrVal
    FROM attribute_store store, distinguished_name dn
    WHERE
    dn.EID IN (      /* FilterCondition header */
    ( /* start group marker */
        SELECT EID FROM ct_lastname at1     /* template for subtree */
            WHERE at1.AttrVal = 'Smith'     /* rooted at node 1414 */
        UNION           /* conjunction marker */
        ( /* start group marker */
            SELECT EID FROM ct_firstname at2    /* template for subtree */
                WHERE at2.AttrVal = 'Jim'       /* rooted at node 1418 */
            INTERSECT     /* conjunction marker */
            SELECT EID FROM ct_manager at3, ct_tel at4  /* template for    */
            WHERE at3.AttrVal like 'John%'              /* subtree rooted  */
            AND at4.AttrVal like '555%'                 /*at node 1408     */
            AND at3.EID=at4.EID
        )   /* end group marker */
    )       /* end group marker */
    )       /* FilterCondition closing section */
    AND (dn.parentdn like :bdn OR (dn.rdn like :rdn    /* closing section */
        AND dn.parent dn like :pdn))
    AND dn.EID=Store.EID
    AND dn.EID >= :entryThreshold
ORDER BY store.EID
```

In an alternate embodiment, a shortened process is followed if the very first node under examination is part of a base condition. If this occurs, then additional select statements are not placed into the body section of the template. Instead, the body section merely contains a "WHERE" clause that sets forth the conditions that are searched for. The select statement in the header section controls the operation of the "WHERE" clause.

An additional optimization to the invention recognizes that certain filter types do not substantively result in any actual filtering. For example, the term (objectclass=*) refers to all entries. The generated SQL for this element can therefore directly use the distinguished name table (i.e., by not accessing the attribute catalog tables) to filter entries belonging to the appropriate tree for the base of the search.

The foregoing process for generating SQL is a mechanical process that applies to any LDAP search filter of arbitrary complexity. Other types of queries, whether LDAP compliant or not, can also be similarly processed to generate SQL. To accomplish this, the appropriate templates are fabricated to handle possible conditions and condition operators in the search term. The present invention is not limited to queries, but is equally applicable to other kinds of database operations. Thus, the foregoing process can be utilized to generate a SQL statement to modify, add, or delete LDAP information objects from a database.

Hardware Overview

Figure 19:
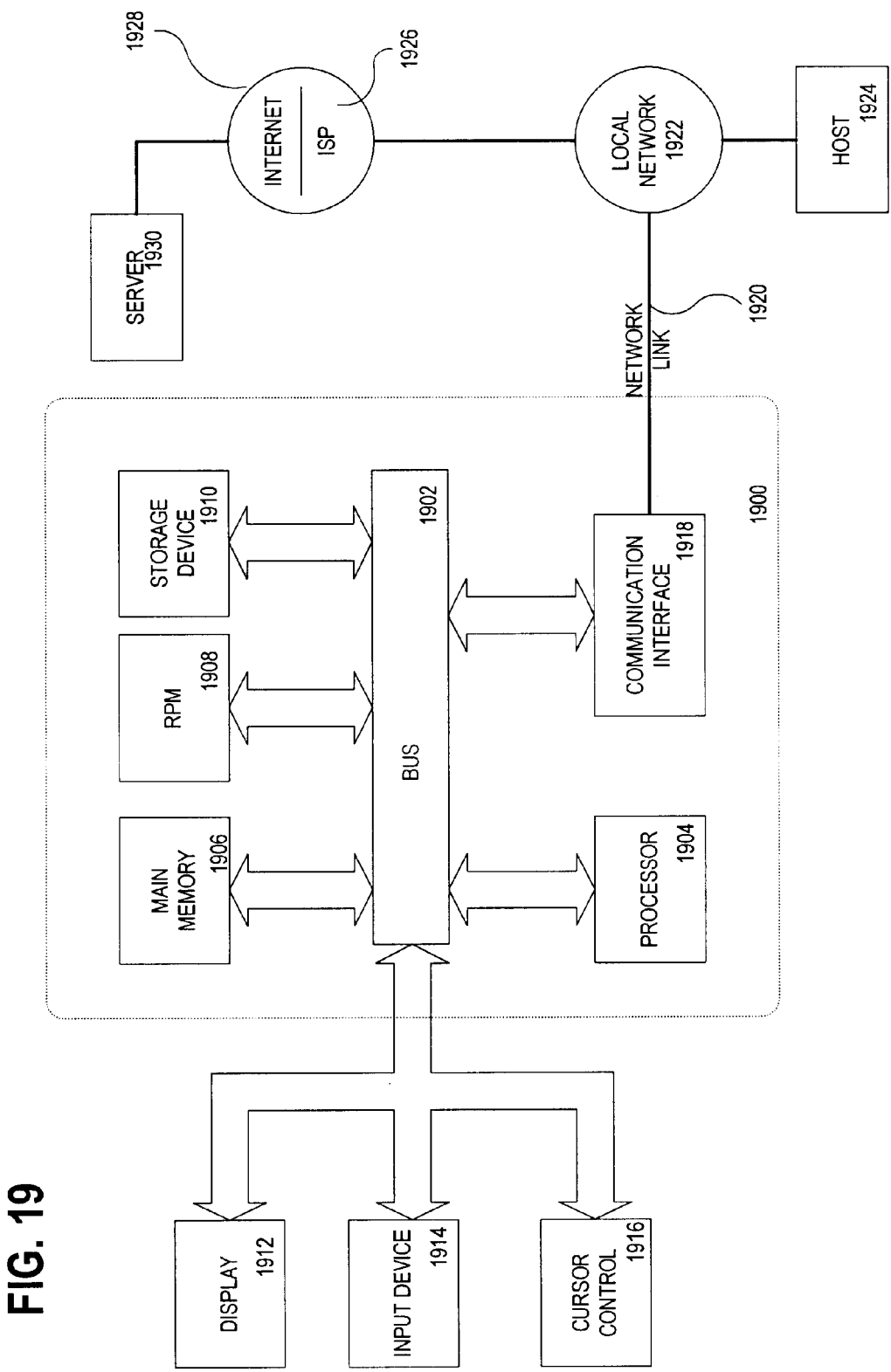
FIG. 19 is a diagram of a computer hardware system with which the present invention can be implemented.

FIG. 19 is a block diagram that illustrates a computer system 1900 upon which an embodiment of the invention may be implemented. Computer system 1900 includes a bus 1902 or other communication mechanism for communicating information, and a processor 1904 coupled with bus 1902 for processing information. Computer system 19400 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device coupled to bus 1902 for storing static information and instructions for processor 1904. A storage device 1910, such as a magnetic disk or optical disk, is provided and coupled to bus 1902 for storing information and instructions.

Computer system 1900 may be coupled via bus 1902 to a display 1912, such as a cathode ray tube (CRT), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

The invention is related to the use of computer system 1900 for the generation of a statement in a database query language. According to one embodiment of the invention, such use is provided by computer system 1900 in response to processor 1904 executing one or more sequences of one or more instructions contained in main memory 1906. Such instructions may be read into main memory 1906 from another computer-readable medium, such as storage device 1910. Execution of the sequences of instructions contained in main memory 1906 causes processor 1904 to perform the process steps described herein. One or more processors in a multi-processing arrangement may also be employed to execute the sequences of instructions contained in main memory 1906. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1904 for execution. Such a medium may take many forms, including but not limited to, non-volatile media, volatile media, and transmission media. Non-volatile media includes, for example, optical or magnetic disks, such as storage device 1910. Volatile media includes dynamic memory, such as main memory 1906. Transmission media includes coaxial cables, copper wire and fiber optics, including the wires that comprise bus 1902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infrared transmitter to convert the data to an infrared signal. An infrared detector coupled to bus 1902 can receive the data carried in the infrared signal and place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are exemplary forms of carrier waves transporting the information.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918. In accordance with the invention, one such downloaded application provides for the generation of a statement in a database query language.

The received code may be executed by processor 1904 as it is received, and/or stored in storage device 1910, or other non-volatile storage for later execution. In this manner, computer system 1900 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for searching for directory information stored in a relational database, comprising the steps of:

receiving a search request for the directory information;

parsing the search request to generate an expression tree including a plurality of nodes, each node representing a condition operator and having at least one branch representing at least one expression modified by the condition operator;

identifying search conditions in the expression tree;

identifying at least one template corresponding to the search conditions, the at least one template selected from a plurality of possible templates;

generating a statement in a database query language that searches for a directory information object stored in the relational database from the at least one template, the at least template inserting a constraint in the statement based upon a hierarchical scope of the search request for the directory information.

2. The method of claim 1, wherein the step of identifying search conditions includes identifying the search conditions comprising base condition operators.

3. The method of claim 2, wherein the step of identifying search conditions further includes identifying the base condition operators including at most one of "AND" and "OR" operators.

4. The method of claim 2, wherein the step of identifying search conditions further includes identifying the base condition operations including at most one of "AND", "OR", and "NOT" operators.

5. The method of claim 1, wherein the step of generating a statement includes generating the statement comprising a structured query language (SQL) statement.

6. The method of claim 5, wherein the step of generating a statement further includes generating the statement comprising at most one SQL statement.

7. The method of claim 2, wherein the step of generating a statement includes generating the statement comprising a combination of at least one JOIN operation and at least one other aggregation operation.

8. The method of claim 7, further comprising the step of generating a database JOIN operation to aggregate data within one of the search conditions identified as being one of the base condition operators.

9. The method of claim 7, further comprising the step of generating a database INTERSECT operation between a first and a second base condition operators, said first and second base condition operators being rooted by an AND operator.

10. The method of claim 7, further comprising the step of generating a database UNION operation between a first and a second base condition operators, said first and second base condition operators being rooted by an OR operator.

11. The method of claim 1, wherein the step of generating a statement includes searching the directory information object comprising a Lightweight Directory Access Protocol (LDAP) object.

12. The method of claim 1, wherein the step of receiving a search request includes receiving the search request as a Lightweight Directory Access Protocol (LDAP) search filter.

13. The method of claim 1, further comprising the steps of:
generating a first set of query statements to fill in a header section of the at least one template;
generating a second set of query statements to fill in a body section of the at least one template; and
generating a third set of query statements to fill in a closing section of the at least one template.

14. The method of claim 13, wherein the step of generating a first set of query statements includes identifying database tables to be accessed.

15. The method of claim 14, wherein the step of identifying database tables includes identifying a database table that stores object attribute information.

16. The method of claim 14, wherein the step of identifying database tables includes identifying a database table that stores distinguished names information.

17. The method of claim 13, wherein the step of generating a second set of query statements includes identifying catalog tables to be accessed.

18. The method of claim 13, wherein the step of generating a second set of query statements includes generating the second set of query statements related to the search conditions identified in the expression tree.

19. The method of claim 13, wherein the step of generating a third set of query statements includes generating the third set of query statements comprising ordering operations.

20. The method of claim 13, wherein the step of generating a third set of query statements includes generating the third set of query statements comprising filtering operations based upon at least one database table identified in the first set of query statements.

21. The method of claim 1, wherein the step of generating a statement includes defining the hierarchical scope of the search request as a subtree search.

22. A method for searching for directory information stored in a relational database, comprising:
parsing a search request for the directory information to generate an expression tree;
identifying search conditions in the expression tree;
identifying a base template corresponding to the expression tree, the base template comprising one or more other templates, each of the one or more other templates corresponding to at least one of the search conditions in the expression tree; and
generating a statement in a database query language to search for directory information stored in the relational database using the base template.

23. The method of claim 22, wherein the step of identifying search conditions includes identifying the search conditions comprising a base condition operator.

24. The method of claim 23, wherein the step of identifying search conditions further includes identifying the base condition operator including at most one of "AND" and "OR" operators.

25. The method of claim 23, wherein the step of identifying search conditions further includes identifying the base condition operator including at most one of "AND", "OR", and "NOT" operators.

26. The method of claim 22, wherein the step of generating a statement includes generating the statement comprising a combination of at least one JOIN operation and at least one other aggregation operation.

27. The method of claim 26, further comprising the step of generating a database JOIN operation to aggregate data within one of the search conditions identified as being a base condition operator.

28. The method of claim 26, further comprising the step of generating a database INTERSECT operation between a first and a second base condition operators rooted by an AND operator.

29. The method of claim 26, further comprising the step of generating a database UNION operation between a first and a second base condition operators rooted by an OR operator.

30. The method of claim 22, wherein the step of generating a statement includes generating the statement for searching the directory information object comprising a Lightweight Directory Access Protocol (LDAP) object.

31. The method of claim 22, wherein the step of generating a statement includes a single statement with nested SELECT clauses.

32. The method of claim 22, wherein the step of generating a statement includes defining the hierarchical scope of the search request as a subtree search.

33. A medium having stored thereon a sequence of instructions which, when executed by a processor, causes an execution of a process for searching for directory information in a relational database, the process comprising:
generating an expression tree by parsing the search request, the expression tree comprising a plurality of search conditions;
identifying a base template corresponding to the expression tree, the base template comprising one or more other templates, each of the one or more other templates corresponding to at least one of the plurality of search conditions in the expression tree; and
generating a statement in a database query language to search for directory information in the relational database using the base template.

34. The medium of claim 33, wherein the step of generating a statement includes a single statement with nested SELECT clauses.

35. The medium of claim 33, wherein the step of generating a statement includes a single statement with a plurality of subqueries, each including a SELECT clause.

36. A medium having stored thereon a sequence of instructions which, when executed by a processor, causes an execution of a process of searching for directory information objects in a relational database by performing the steps of:
receiving a search request for the directory information;
parsing the search request to generate an expression tree including a node representing a condition operator and having a branch representing an expression modified by the condition operator;
identifying search conditions in the expression tree;
identifying at least one template corresponding to the search conditions, the at least one template selected from a plurality of possible template;
generating a statement in a database query language that searches for a directory information objects stored in the relational database from the at least one template, the at least template inserting a constraint in the statement based upon a hierarchical scope of the search request for the directory information objects.

37. A method for searching for directory information stored in a relational database, comprising the steps of:
- parsing a search request for the directory information to generate an expression tree;
- identifying search conditions in the expression tree;
- identifying at least one template corresponding to the search conditions; and
- generating a statement for searching for a directory information object stored in the relational database in a database query language using the at least one template, each of the at least one template inserting at least one subquery in response to a corresponding search condition in the expression tree.

38. A medium having stored thereon a sequence of instructions which, when executed by a processor, causes an execution of a process of searching for directory information in a relational database by performing the steps of:
- receiving a search request;
- parsing the search request to generate an expression tree;
- identifying at least one template corresponding to search conditions in the expression tree; and
- generating a statement for searching for a directory information object stored in the relational database in a database query language using the at least one template, each of the at least one template inserting at least one subquery in response to a corresponding search condition in the expression tree.

* * * * *